United States Patent
Lee et al.

(10) Patent No.: US 10,998,994 B2
(45) Date of Patent: May 4, 2021

(54) SIGNAL TRANSMISSION METHOD FOR REMOVING PHASE NOISE IN WIRELESS COMMUNICATION SYSTEM AND DEVICE THEREFOR

(71) Applicant: LG ELECTRONICS INC., Seoul (KR)

(72) Inventors: Kilbom Lee, Seoul (KR); Hyunsoo Ko, Seoul (KR); Kyuseok Kim, Seoul (KR); Kijun Kim, Seoul (KR); Jiwon Kang, Seoul (KR); Kunil Yum, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 99 days.

(21) Appl. No.: 16/380,822

(22) Filed: Apr. 10, 2019

(65) Prior Publication Data
US 2019/0238247 A1    Aug. 1, 2019

Related U.S. Application Data

(63) Continuation of application No. PCT/KR2017/011164, filed on Oct. 11, 2017.

(60) Provisional application No. 62/406,934, filed on Oct. 11, 2016, provisional application No. 62/417,367, filed on Nov. 4, 2016, provisional application No. 62/476,744, filed on Mar. 25, 2017, provisional application No. 62/505,976, filed on May 14, 2017.

(51) Int. Cl.
*H04J 11/00* (2006.01)
*H04L 27/12* (2006.01)
*H04L 27/38* (2006.01)
*H04L 5/00* (2006.01)

(52) U.S. Cl.
CPC ........ *H04J 11/0023* (2013.01); *H04L 5/0007* (2013.01); *H04L 27/12* (2013.01); *H04L 27/38* (2013.01)

(58) Field of Classification Search
CPC .... H04J 11/0023; H04L 5/0007; H04L 27/12; H04L 27/38
See application file for complete search history.

(56) References Cited

U.S. PATENT DOCUMENTS

2015/0326335 A1    11/2015  Chen et al.
2019/0356463 A1*   11/2019  Zhang ................... H04W 80/08
2020/0008228 A1*    1/2020  Lee ......................... H04L 5/001

OTHER PUBLICATIONS

PCT International Application No. PCT/KR2017/011164, Written Opinion of the International Searching Authority dated Jan. 22, 2018, 21 pages.

(Continued)

*Primary Examiner* — Luat Phung
(74) *Attorney, Agent, or Firm* — Lee Hong Degerman Kang Waimey

(57) ABSTRACT

According to one embodiment of the present specification, a method by which a base station transmits a signal for removing phase noise in an mmWave communication system can be provided, wherein the method for removing phase noise can comprise the steps of: generating a shared PTRS for phase noise of a downlink signal; transmitting, to a terminal, shared PTRS pattern information on the shared PTRS through downlink signaling; and transmitting, to the terminal, the shared PTRS on the basis of the shared PTRS pattern information transmitted to the terminal.

18 Claims, 31 Drawing Sheets

(56) References Cited

OTHER PUBLICATIONS

Intel, "Study of Phase Noise Tracking", 3GPP TSG RAN WG1 Meeting #86bis, R1-1609529, Oct. 2016, 7 pages.
Huawei, et al., "Reference signal design for phase noise compensation in HF", 3GPP TSG RAN WG1 Meeting #86bis, R1-1608822, Oct. 2016, 5 pages.
Intel, "Study of phase noise tracking", 3GPP TSG RAN WG1 Meeting #86, R1-166562, Aug. 2016, 6 pages.
LG Electronics, "Discussion on Common Phase Error Compensation for Above 6GHz", 3GPP TSG RAN WG1 Meeting #86bis, R1-1609261, Oct. 2016, 11 pages.

* cited by examiner

FIG. 1
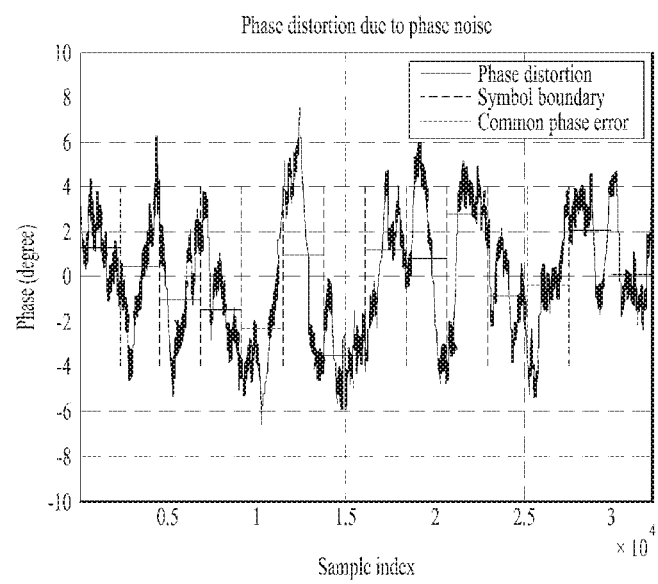
(a)
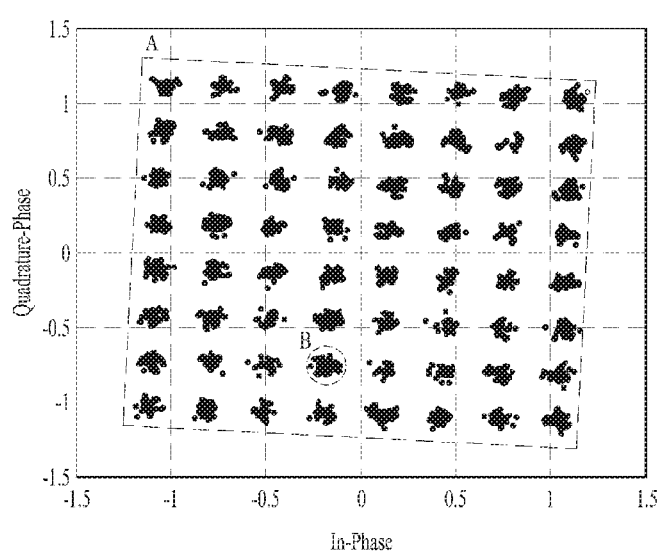
(b)

FIG. 2
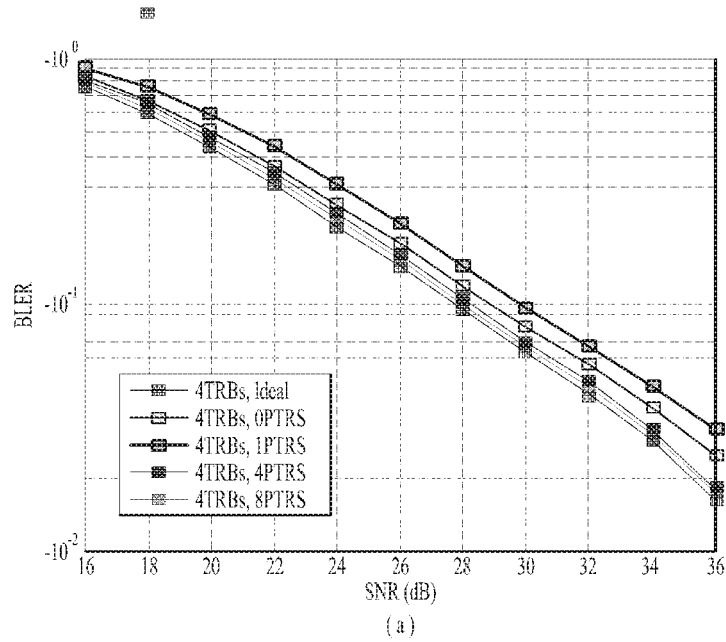
(a)
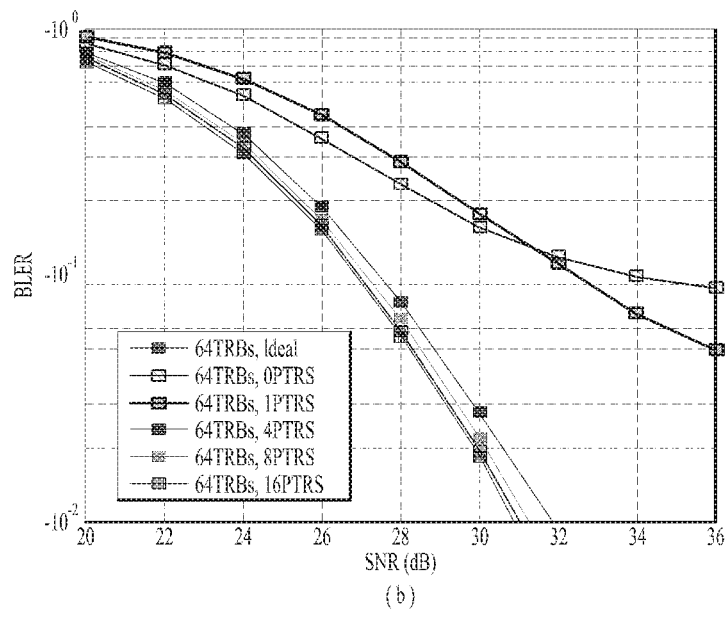
(b)

FIG. 8
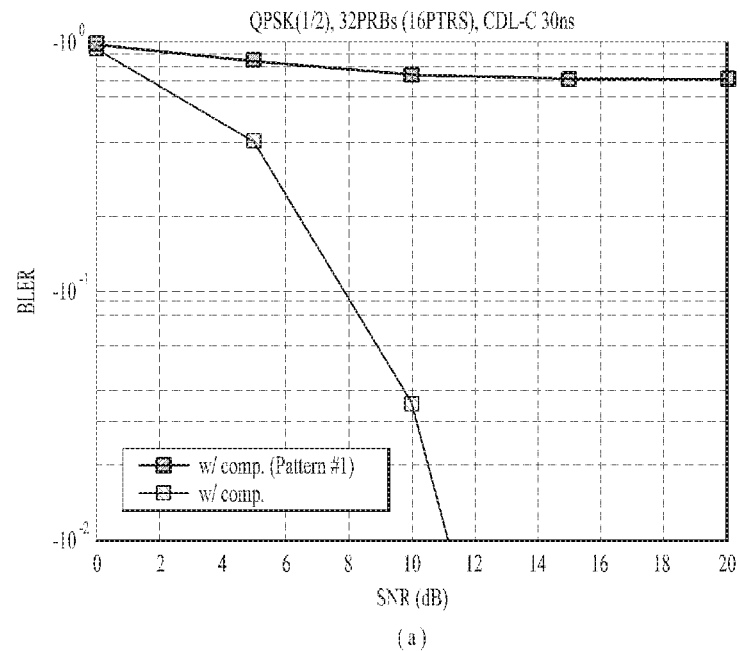
(a)
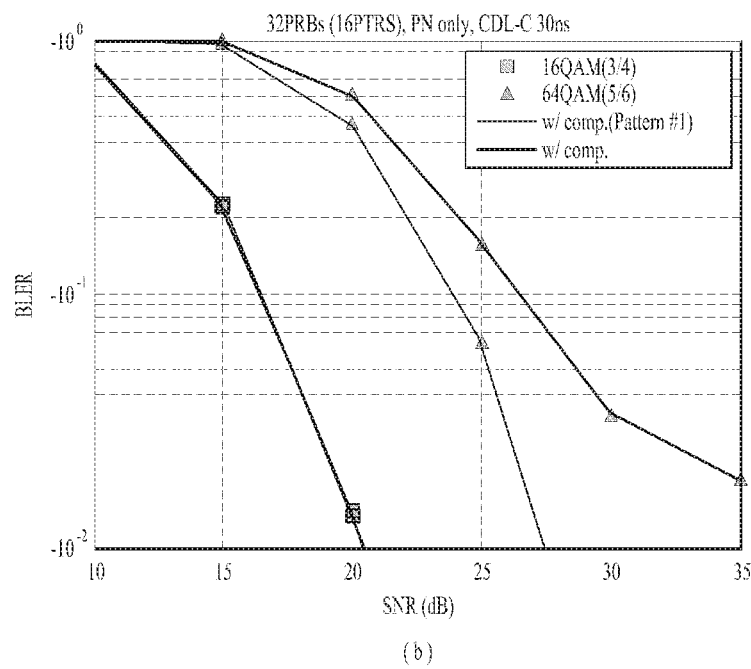
(b)

FIG. 10
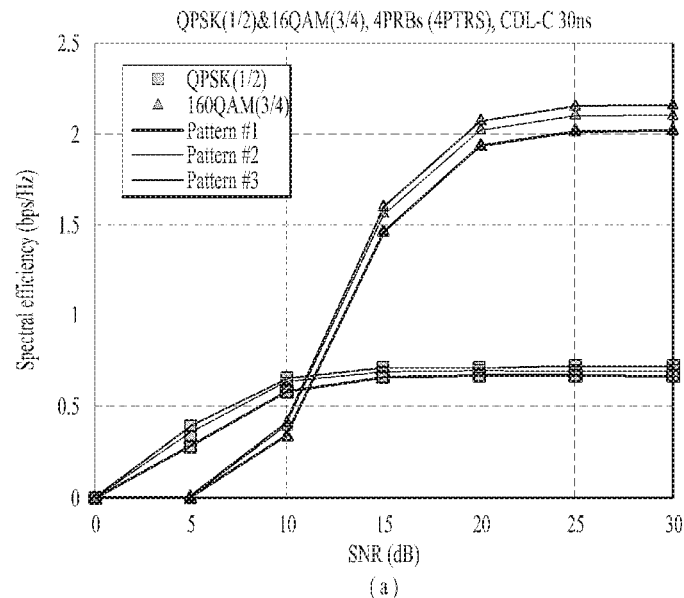
(a)
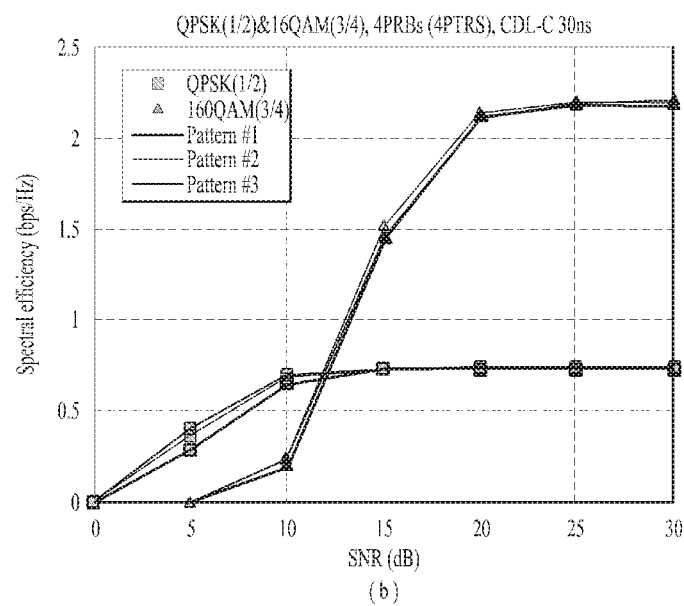
(b)

FIG. 11
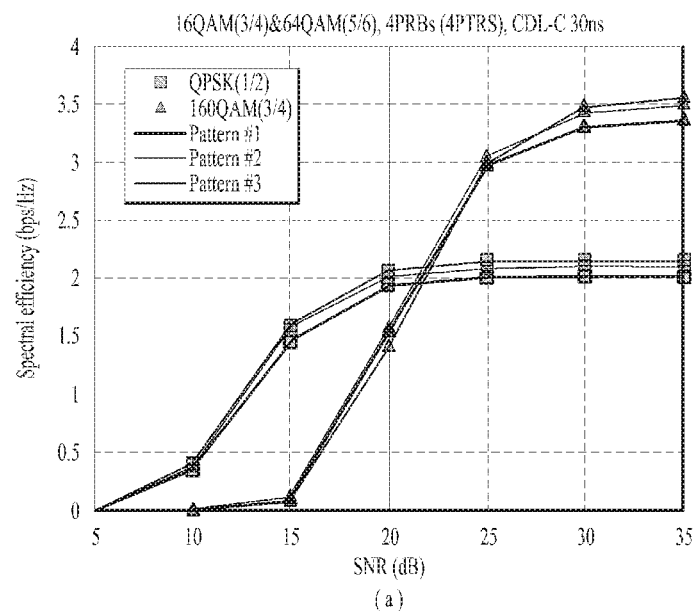
(a)
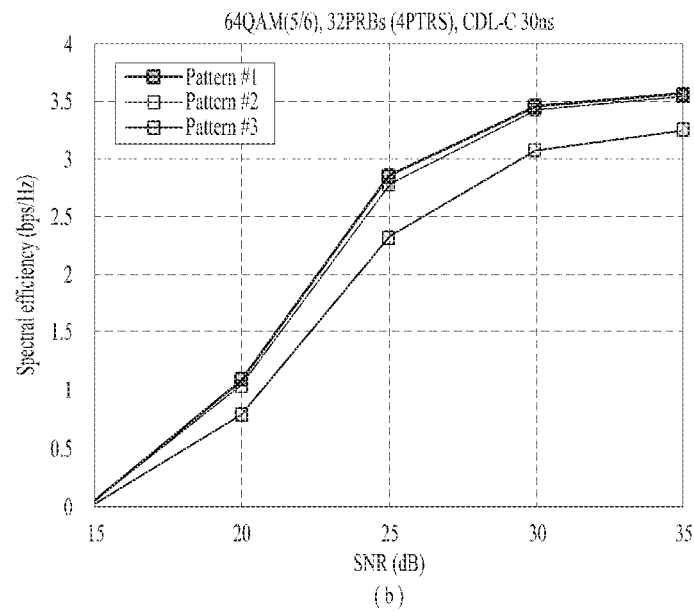
(b)

FIG. 12
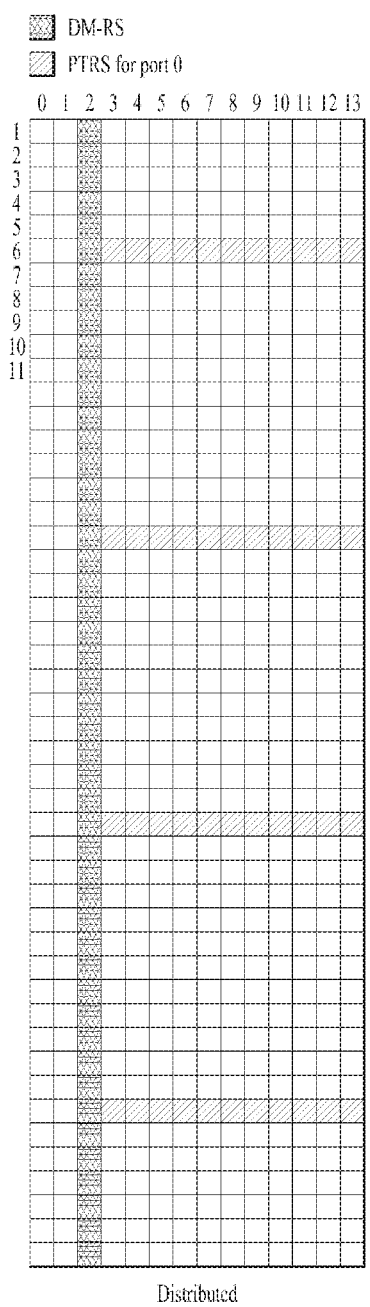
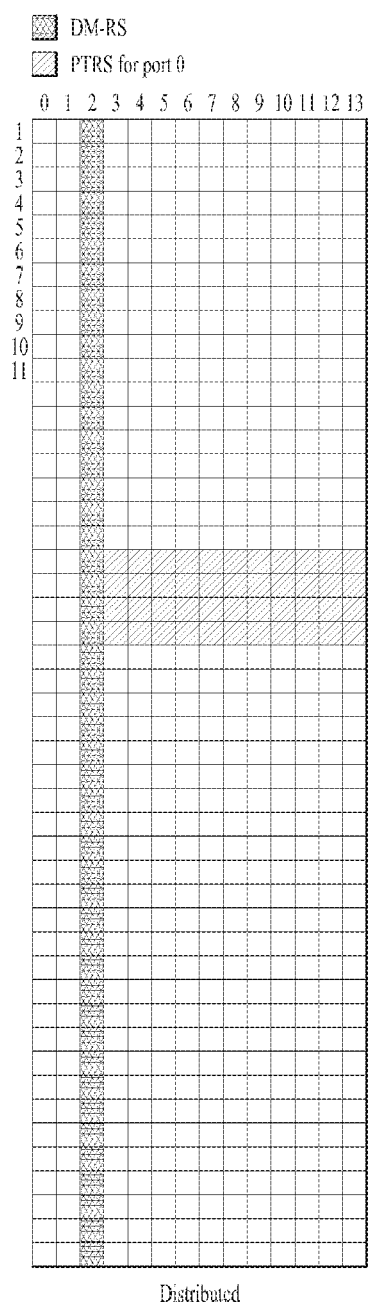

FIG. 21
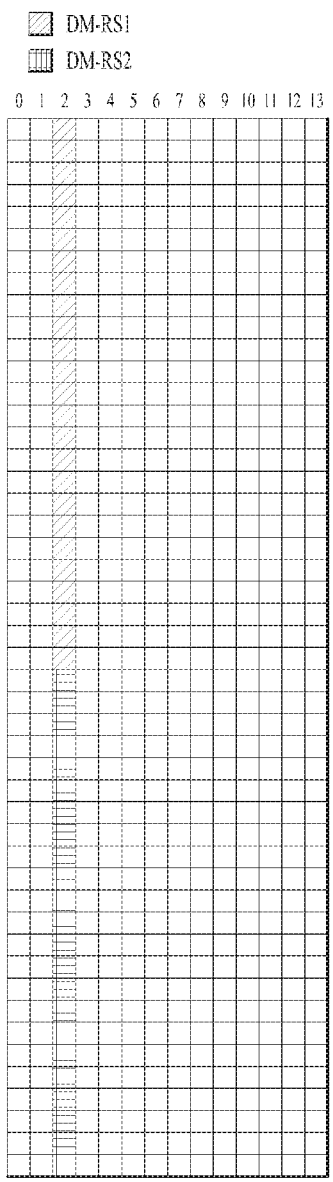
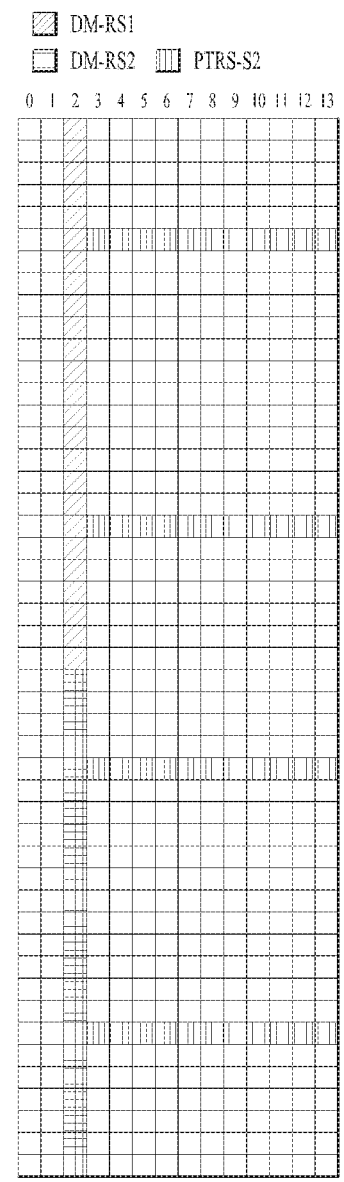

SIGNAL TRANSMISSION METHOD FOR REMOVING PHASE NOISE IN WIRELESS COMMUNICATION SYSTEM AND DEVICE THEREFOR

CROSS-REFERENCE TO RELATED APPLICATIONS

This application a continuation of International Application No. PCT/KR2017/011164, filed on Oct. 11, 2017, which claims the benefit of U.S. Provisional Applications Nos. 62/406,934 filed on Oct. 11, 2016, 62/417,367 filed on Nov. 4, 2016, 62/476,744 filed on Mar. 25, 2017, and 62/505,976 filed on May 14, 2017, the contents of which are all hereby incorporated by reference herein in their entireties.

TECHNICAL FIELD

The present disclosure relates to a wireless communication system, and more particularly, to a method and device for transmitting a signal for phase noise cancellation in a system.

BACKGROUND ART

An ultra-high frequency wireless communication system using mmWave is configured to operate at a center frequency in the range of several GHz to several tens of GHz. Due to such a center frequency feature, significant path loss may occur in a shadow area in the mmWave communication system. Considering that a synchronization signal should be stably transmitted to all terminals within coverage of a base station, the synchronization signal needs to be designed and transmitted in consideration of the potential deep-null phenomenon, which may occur due to the above-described ultra-high frequency band characteristics, in the mmWave communication system.

DISCLOSURE OF THE INVENTION

Technical Task

The present disclosure is contrived to solve the aforementioned problems. Accordingly, an object of the present disclosure is to enable accurate decoding of received signals by improving a phase noise cancellation procedure performed by a terminal in a wireless communication system.

Another object of the present disclosure is to provide a method of improving signal transmission efficiency for phase noise cancellation.

Still another object of the present disclosure is to improve receiving-side operation by providing information on signal transmission for phase noise cancellation.

A further object of the present disclosure is to provide a method of transmitting a signal for phase noise cancellation by considering compensation for phase noise and reference signal overhead.

Technical Solution

In an embodiment of the present disclosure, provided is a method of transmitting a signal for phase noise cancellation by a base station in a mmWave communication system. The method may include: generating a shared Phase Tracking Reference Signal (PTRS) for phase noise of a downlink signal; transmitting shared-PTRS pattern information on the shared PTRS to a User Equipment (UE) through downlink signaling; and transmitting the shared PTRS to the UE based on the shared-PTRS pattern information transmitted to the UE.

In another embodiment of the present disclosure, provided is a base station for transmitting a signal for phase noise cancellation in a mmWave communication system. The base station may include: a receiver configured to receive signals from external devices; a transmitter configured to transmit signals to external devices; and a processor configured to control the receiver and the transmitter. The processor may be configured to: generate a shared Phase Tracking Reference Signal (PTRS) for phase noise of a downlink signal; transmit shared-PTRS pattern information on the shared PTRS to a User Equipment (UE) through downlink signaling; and transmit the shared PTRS to the UE based on the shared-PTRS pattern information transmitted to the UE.

The following can be commonly applied to the method and device for transmitting a signal for phase noise cancellation in a mmWave communication system.

According to an embodiment of the present disclosure, a UE-dedicated PTRS may be further generated for the phase noise of the downlink signal, UE-dedicated-PTRS pattern information on the UE-dedicated PTRS may be further transmitted to the UE through the downlink signaling, and the UE-dedicated PTRS may be further transmitted to the UE based on the UE-dedicated-PTRS pattern information transmitted to the UE.

According to an embodiment of the present disclosure, the shared PTRS may be shared with another UE, and the UE-dedicated PTRS may be used only by a specific UE.

According to an embodiment of the present disclosure, a resource location of the shared PTRS in frequency and time domains may vary in each cell.

According to an embodiment of the present disclosure, the resource location in the frequency and time domains may be determined by either or both of Radio Resource Control (RRC) and a cell ID.

According to an embodiment of the present disclosure, the shared PTRS may have precoding identical to that of a Demodulation Reference Signal (DMRS) located in the same frequency domain.

According to an embodiment of the present disclosure, the shared PTRS may be configured in one Orthogonal Frequency Division Multiplexing (OFDM) symbol in the time domain.

According to an embodiment of the present disclosure, the shared PTRS may have precoding different from that of a Demodulation Reference Signal (DMRS) located in the same frequency domain.

According to an embodiment of the present disclosure, the shared PTRS may be configured in two Orthogonal Frequency Division Multiplexing (OFDM) symbols in the time domain.

According to an embodiment of the present disclosure, a plurality of shared-PTRS patterns may be configured for the UE through either or both of Radio Resource Control (RRC) and Downlink Control Information (DCI), and information for selecting any one from among the plurality of shared-PTRS patterns configured for the UE may be additionally configured through either or both of the RRC and the DCI.

Advantageous Effects

According to the present disclosure, it is possible to accurately decode a received signal by improving a phase noise cancellation procedure performed by a terminal in a wireless communication system.

According to the present disclosure, a method of improving signal transmission efficiency for phase noise cancellation can be provided.

According to the present disclosure, receiving-side operation can be improved by providing information on signal transmission for phase noise cancellation.

According to the present disclosure, a method for determining power boosting level of a PTRS can be provided.

According to the present disclosure, a method of transmitting a signal for phase noise cancellation by considering compensation for phase noise and reference signal overhead can be provided.

It will be appreciated by persons skilled in the art that the effects that can be achieved through the present disclosure are not limited to what has been particularly described hereinabove and other advantages of the present disclosure will be more clearly understood from the following detailed description.

DESCRIPTION OF DRAWINGS

FIG. 1 is a diagram illustrating phase distortion caused by phase noise.

FIG. 2 is a diagram illustrating Block Error Rate (BLER) performance according to PTRS density in the frequency domain.

FIG. 8 is a diagram illustrating BLER performance measured based on PTRSs.

FIG. 10 is a diagram illustrating BLER performance measured based on PTRSs.

FIG. 11 is a diagram illustrating BLER performance measured based on PTRSs.

FIG. 12 is a diagram illustrating PTRS arrangement methods.

FIG. 21 is a diagram illustrating a method of indicating whether a shared PTRS is transmitted by defining it as one type.

MODE FOR CARRYING OUT THE INVENTION

Figure 3:
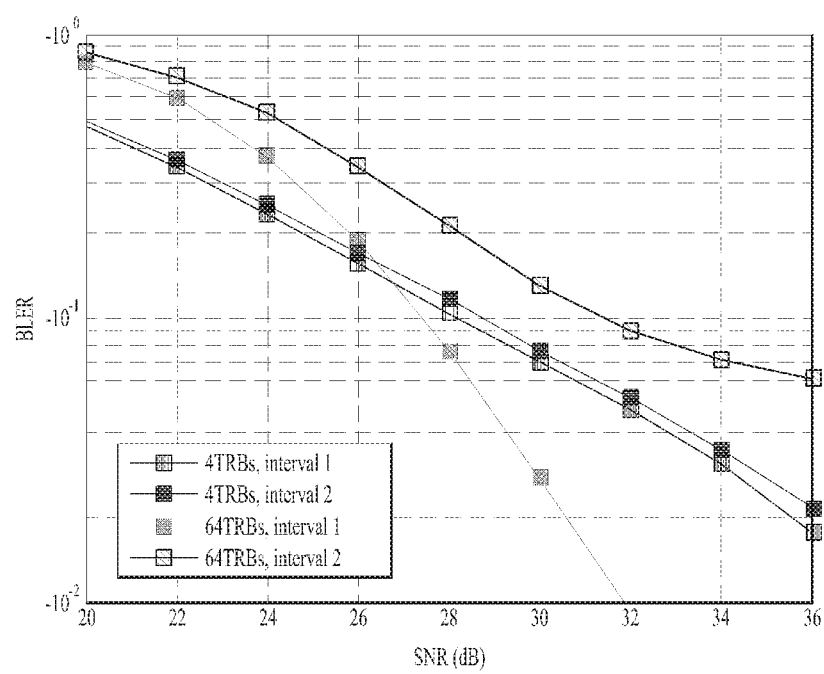
FIG. 3 is a diagram illustrating BLER performance according to PTRS density in the time domain.

Although the terms used in this specification are selected from generally known and used terms, the terms may vary depending on operator's intention or customs in the art, the appearance of new technology, or the like. In addition, some of the terms are selected by the applicant at his or her discretion, and in this case, the detailed meanings thereof will be described in relevant parts. Accordingly, the terms in the present specification should be understood not simply by the actual names but by the meanings thereof.

The following embodiments are proposed by combining constituent components and characteristics of the present disclosure according to a predetermined format. The individual constituent components or characteristics should be considered optional factors on the condition that there is no additional remark. If required, the individual constituent components or characteristics may not be combined with other components or characteristics. In addition, some constituent components and/or characteristics may be combined to implement the embodiments of the present disclosure. The order of operations to be disclosed in the embodiments of the present disclosure may be changed. Some components or characteristics of any embodiment may also be included in other embodiments, or may be replaced with those of the other embodiments as necessary.

In describing the present disclosure, if it is determined that the detailed description of a related known function or construction renders the scope of the present disclosure unnecessarily ambiguous, the detailed description thereof will be omitted.

In the entire specification, when a certain portion "comprises or includes" a certain component, this indicates that the other components are not excluded and may be further included unless specially described otherwise. The terms "unit", "-or/er" and "module" described in the specification indicate a unit for processing at least one function or operation, which may be implemented by hardware, software or a combination thereof. The words "a or an", "one", "the" and words related thereto may be used to include both a singular expression and a plural expression unless the context describing the present disclosure (particularly, the context of the following claims) clearly indicates otherwise.

In this specification, the embodiments of the present disclosure have been described based on a data transmission and reception relationship between a mobile station and a base station. Here, the base station may mean a terminal node of the network which directly communicates with the mobile station. In this document, a specific operation described as performed by the base station can also be performed by an upper node of the base station.

That is, in the network consisting of a plurality of network nodes including the base station, various operations performed for communication with the mobile station may be performed by the base station or other network nodes except the base station. The term "base station" may be replaced with terms such as "fixed station", "Node B", "eNode B (eNB)", "advanced base station (ABS)", "access point", etc.

The term "mobile station (MS)" may be replaced with terms such as "user equipment (UE)", "subscriber station (SS)", "mobile subscriber station (MSS)", "mobile terminal", "advanced mobile station (AMS)", "terminal", etc.

In addition, a transmitting end refers to a fixed and/or mobile node that transmits data or voice services, and a receiving end refers to a fixed and/or mobile node that receive data or voice services. Accordingly, in uplink, the mobile station and base station may correspond to the transmitting end and receiving end, respectively. Similarly, in downlink, the mobile station and base station may correspond to the receiving end and transmitting end, respectively.

When a device performs communication with a 'cell', it may indicate that the device transmits and receive signals with a base station of the cell. That is, although the device actually transmits and receives signals with a specific base station, it can be interpreted to mean that the device transmits and receives signals with a cell formed by the specific base station. Similarly, "macro cell" and/or "small cell" may mean not only specific coverage but also "macro base station supporting the macro cell" and/or "small cell base station supporting the small cell".

The embodiments of the present disclosure can be supported by standard documents disclosed in at least one of wireless access systems including the IEEE 802.xx system, 3GPP system, 3GPP LTE system, and 3GPP2 system. That is, the steps or parts, which are not explained to clearly reveal the technical idea of the present disclosure, in the embodiments of the present disclosure may be supported by the above documents.

In addition, details of all terms mentioned in the present document can be found in the above standard documents. In particular, the embodiments of the present disclosure can be supported by at least one of documents P802.16e-2004, P802.16e-2005, P802.16.1, P802.16p and P802.16.1b, which are standard documents for the IEEE 802.16 system.

Hereinafter, the preferred embodiments of the present disclosure will be described in detail with reference to the accompanying drawings. It is to be understood that the detailed description which will be disclosed along with the accompanying drawings is intended to describe the exemplary embodiments of the present disclosure and is not intended to describe a unique embodiment for carrying out the present disclosure.

It should be noted that specific terms disclosed in the present disclosure are provided for better understanding of the present disclosure and these specific terms may be changed to other terms without departing from the technical scope or spirit of the present disclosure.

1. Phase Noise Analysis and Phase Tracking Reference Signal (PTRS) Design

FIG. 1 illustrates phase distortion caused by phase noise. The phase noise may be defined as fluctuation in the phase of a signal occurring in a short time. In this case, since the phase noise could randomly change the phase of a received signal in the time domain, it may interrupt the reception of the signal. For example, referring to FIG. 1(a), the phase noise may randomly occur. However, the phase noise may show certain correlation between adjacent time samples, which causes Common Phase Error (CPE) and Inter Carrier Interference (ICI) in the frequency domain.

FIG. 1(b) shows the effect of CPE and ICI on received constellation points. It can be seen from FIG. 1(b) that in square 'A', all constellation points are rotated in three degrees, which results from the CPE. In addition, in circle 'B', constellation points are randomly placed, which results from the ICI. Accordingly, the CPE needs to be compensated for based on the phase noise, and a Phase Tacking Reference Signal (PTRS) can be used for CPE estimation. Table 1 below shows simulation conditions related to the phase noise.

TABLE 1

| PN Model | PN model 2 in [2] | CFO | 0 kHz |
| --- | --- | --- | --- |
| Carrier Frequency | 30 GHz | # of Traffic RBs | 4/64 |
| Subcarrier Spacing | 60 kHz | # of System RBs | 100 |
| Channel | TDL-B(30 ns, 0 km/h) | Modulation | 64QAM |
| Channel Estimation | Ideal | Code Rate | 5/6 |
| CPE Estimation | Real | | |

Referring to Table 1, it can be seen how the PTRS affects the CPE estimation when the number of traffic RBs varies.

FIG. 2 is a diagram illustrating block error rate (BLER) performance according to PTRS density in the frequency domain. Specifically, FIGS. 2(a) and 2(b) show the results of measuring the BLER performance when the PTRS density is changed to 0, 1, 4, 8, and 16 on OFDM symbols in the frequency domain. Here, "PTRS=0" indicates no CPE compensation, and "Ideal" indicates the state in which CPE compensation is performed. More specifically, FIG. 2(a) shows the results of measuring the BLER performance by changing the PTRS density in the frequency domain when there are 4 TRBs, and FIG. 2(b) shows the results of measuring the BLER performance by changing the PTRS density in the frequency domain when there are 64 TRBs.

By comparing FIGS. 2(a) and 2(b), it can be seen that the BLER performance difference according to the PTRS density increases as the TRB size increases. Specifically, it can be seen from FIG. 2(a), where the TRB size is small, that in the case of PTRS=8, the BLER performance difference between a case where there is no CPE compensation and a case where the CPE compensation is performed is only about 1 dB. On the other hand, it can be seen from FIG. 2(b), where the TRB size is large, that in the case of PTRS=8, the BLER performance difference between the case where there is no CPE compensation and the case where the CPE compensation is performed is about 5.8 dB.

Referring to FIG. 2(b), it can be observed that as the PTRS density increases, the BLER performance is improved up to the ideal case based on the CPE compensation. Specifically, referring to FIG. 2(b), when the PTRS density is equal to or more than 4, the ideal BLER performance can be achieved. Thus, when the PTRS density is 4 or 8, the CPE can be sufficiently compensated for. In FIGS. 2(a) and 2(b), when the PTRS density is 4 or 8, the CPE can be sufficiently compensated for regardless of the TRB size.

FIG. 3 is a diagram illustrating BLER performance according to PTRS density in the time domain.

FIG. 3 shows the results of measuring the BLER performance by changing a PTRS interval in the time domain. In FIG. 3, the number of PTRSs in one OFDM symbol is 4. Referring to FIG. 3, it can be seen that the results are similar to that of FIG. 2. Specifically, it can be observed that as the TRB size increases, the BLER performance difference according to the PTRS density increases in the time domain. That is, when the TRB size is small (4 TRBs in FIG. 3), similar BLER performance can be obtained regardless of the PTRS density in the time domain. However, it can be seen that when the TRB size is large (64 TRBs in FIG. 3), the BLER performance significantly varies according to the PTRS density in the time domain. In other words, the BLER performance difference according to the PTRS density sensitively varies as the TRB size increases.

Figure 4:
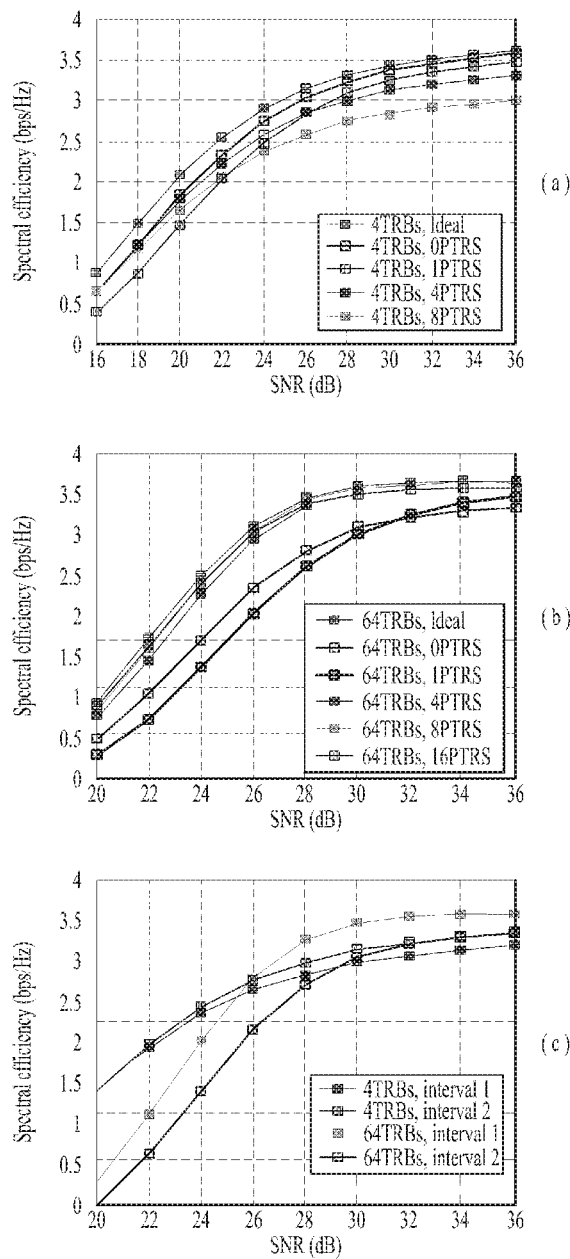
FIG. 4 is a diagram illustrating spectral efficiency for PTRS density according to different TRB sizes.

FIG. 4 is a diagram illustrating spectral efficiency for PTRS density according to different TRB sizes.

FIG. 4(a) shows spectral efficiency according to the number of PTRSs when a TRB size is 4. Referring to FIG. 4(a), it can be seen that when the TRB size is 4, a case where no CPE compensation is performed has better spectral efficiency than a case where CPE compensation is performed with a certain number of PTRSs. When the TRB size is 4, only a single codeblock can be defined in a codeword. In addition, since the codeblock spreads out in the subframe, the impact of the phase noise may be reduced. When the TRB size is small, the CPE compensation may have no significant influence as described with reference to FIG. 2(a). Meanwhile, since the amount of information increases as the number of PTRSs increases, throughput may decrease due to a region where the PTRSs are allocated. Moreover, when the TRB size is small, the throughput loss may be greater than gain obtained from the CPE compensation, and thus PTRSs may be no longer required.

Meanwhile, referring to FIG. 4(b), it can be seen that when the TRB size is 64, the spectral efficiency is close to the ideal one as the number of PTRSs increases. This is because since when the TRB size is large, a plurality of codeblocks can be defined in one codeword and each codeblock spreads out in one or two OFDM symbols, the phase noise may be significantly affected thereby. That is, when high phase noise occurs in a specific OFDM symbol, it may be difficult to successfully decode codeblocks located in the specific OFDM symbol. This can be similarly applied to FIG. 2(b). In other words, as the TRB size increases, the phase noise impact increases and overhead caused by PTRSs relatively decreases. Thus, when the number of PTRSs increase, throughput can be improved.

FIG. 4(c) shows the effect of changes in the PTRS density in the time domain, and it is similar to FIG. 3. That is, when the TRB size is small, the PTRS time density may not significantly affect the throughput. However, as described above, when the TRB size is large, the throughput may significantly vary according to the PTRS time density.

Figure 5:
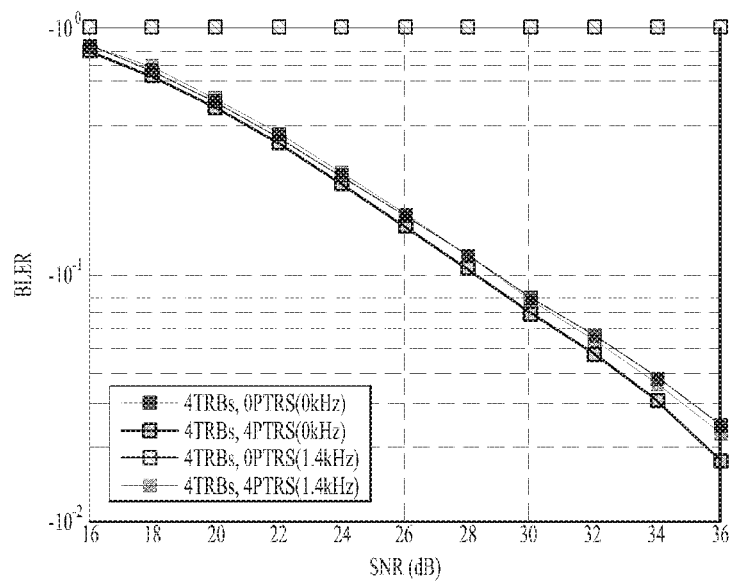
FIG. 5 is a diagram illustrating BLER performance according to Carrier Frequency Offsets (CFOs).

FIG. 5 is a diagram illustrating BLER performance according to carrier frequency offsets (CFO).

As described above, when a TRB size is small, a PTRS may become unnecessary. Nevertheless, the PTRS may be required for even a small TRB because of a CFO caused by oscillator error and Doppler. Referring to FIG. 5, it can be seen that in the case of CFO=1.4 kHz, BLER performance is degraded even when the TRB size is small, for example, 4. In this case, considering that the CFO between a Base Station (BS) and a User Equipment (UE) is about ±0.1 ppm, the maximum CFO may be equal to about 3 kHz for 30 GHz. That, when high frequency is used, the CFO may significantly affect the BLER performance Therefore, the number of PTRSs should be determined by considering CPE compensation and PTRS overhead, which are in a trade-off relationship. Details will be described later.

Figure 6:
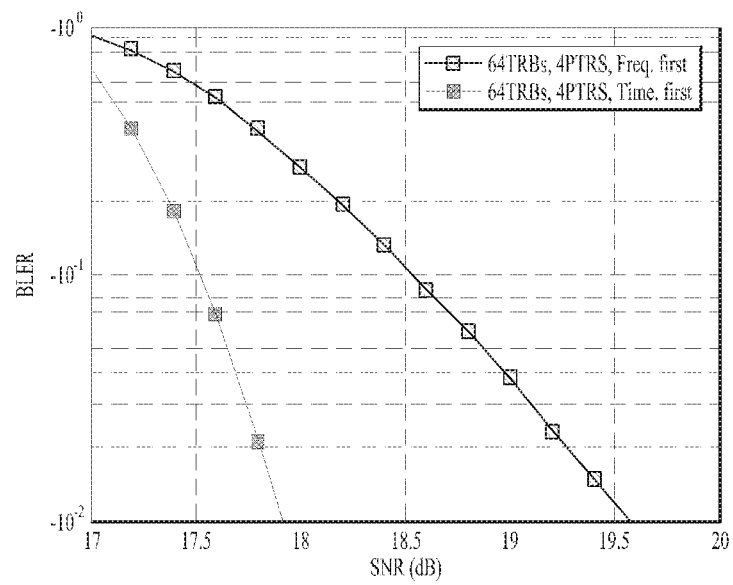
FIG. 6 is a diagram illustrating BLER performance according to PTRS mapping orders: time-first mapping and frequency-first mapping.

FIG. 6 is a diagram illustrating BLER performance according to PTRS mapping orders: time-first mapping and frequency-first mapping.

FIG. 6 shows a case where PTRSs are mapped first in the time domain and a case where PTRSs are mapped first in the frequency domain. Referring to FIG. 6, it can be seen that the case where the PTRSs are mapped first in the time domain has better BLER performance than the case where the PTRSs are mapped first in the frequency domain. This is because of the aforementioned ICI. That is, since when a codeblock is spread out in the time domain, the phase noise impact is reduced, and thus the graph shown in FIG. 6 can be obtained. In addition, this also implies that codeblock spreading in the time domain is effective for reducing the phase noise. Details will be described later.

2. PTRS Design in Consideration of MCS Level

As described above, a PTRS needs to be used by considering the impact of phase noise. In this case, PTRSs should be allocated by considering Reference Signal (RS) overhead.

Figure 7:
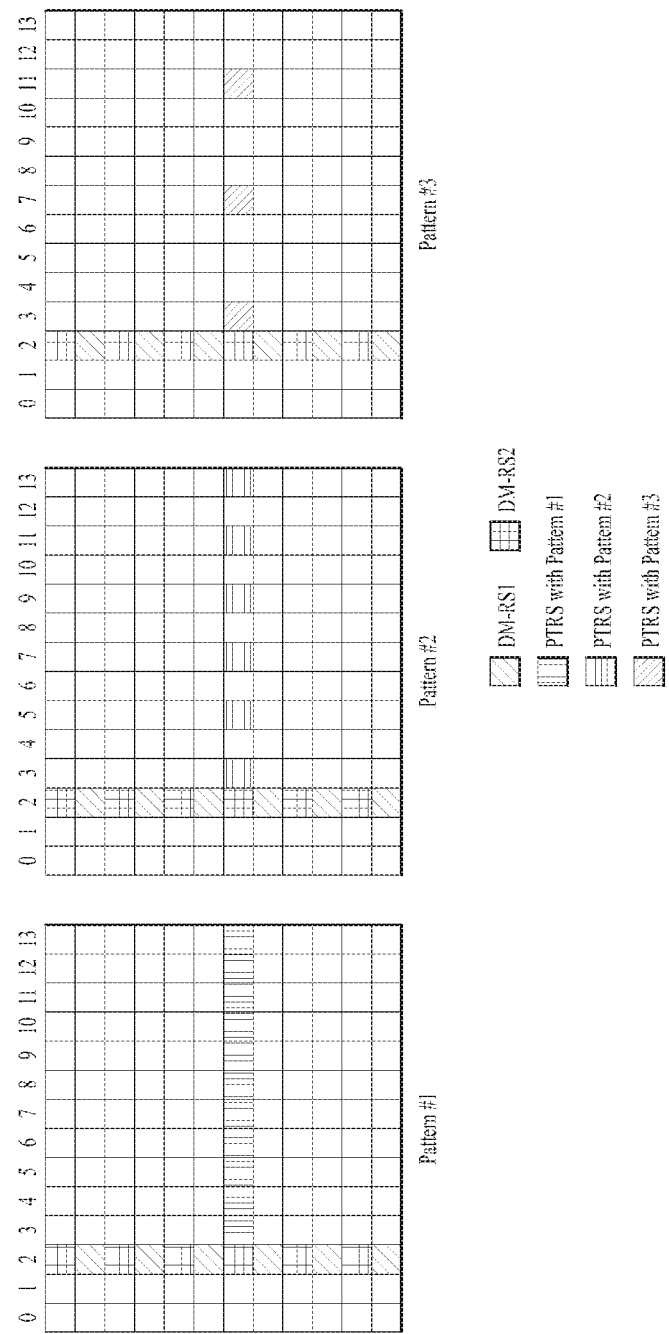
FIG. 7 is a diagram illustrating PTRS allocation patterns.

FIG. 7 is a diagram illustrating PTRS allocation patterns. Referring to FIG. 7, patterns #1 has a time period of 1, patterns #2 has a time period of 2, and patterns #4 has a time period of 4. That is, pattern #1 is a pattern where PTRSs are allocated with the highest density in the time domain, and pattern #3 is a pattern where PTRSs are allocated with the lowest density in the time domain. Table 2 below shows simulation setup configurations to check how each PTRS pattern shown in FIG. 7 affects performance degradation. For example, in Table 2, a CFO may be randomly selected from the range of −3 kHz to 3 kHz, and a modulation & code rate may be set to QPSK (½), 16 QAM (¾) or 64 QAM (⅚).

TABLE 2

| PN Model | PN model 2 in [4] | CFO | [−3 kHz, 3 kHz] |
|---|---|---|---|
| Carrier Frequency | 30 GHz | # of Physical RBs | 4/32 |
| Subcarrier Spacing | 60 kHz | # of System RBs | 100 |
| Channel | CDL-C(30 ns, 3 km/h) | Modulation & Code Rate | QPSK(1/2), 16QAM(3/4), 64QAM(5/6) |
| Channel Estimation | Ideal | CPE Estimation | Real |

FIGS. 8 to 11 shows the results of measuring BLER performance based on Table 2, and from the drawings, the PTRS effect can be understood.

FIG. 8(a) shows the impact of a frequency offset on BLER performance in the absence of phase noise. Referring to FIG. 8(a), it can be seen that when there is no CFO compensation, the BLER performance is degraded even if an MCS level is low as QPSK (½), whereas when the CFO compensation is performed, the BLER performance can be maintained. That is, the CFO compensation can affect the BLER performance even at a low MCS level.

FIG. 8(b) shows the impact of phase noise on BLER performance in the absence of frequency offsets. Here, it can be seen that when the MCS level is high as 64 QAM (⅚), the BLER performance is improved through CPE compensation, whereas when the MCS level is low as 16 QAM (¾), the same BLER performance is obtained regardless of whether the CPE compensation is performed. That is, as the MCS level is higher, the impact of the phase noise on the BLER performance may increase.

Figure 9:
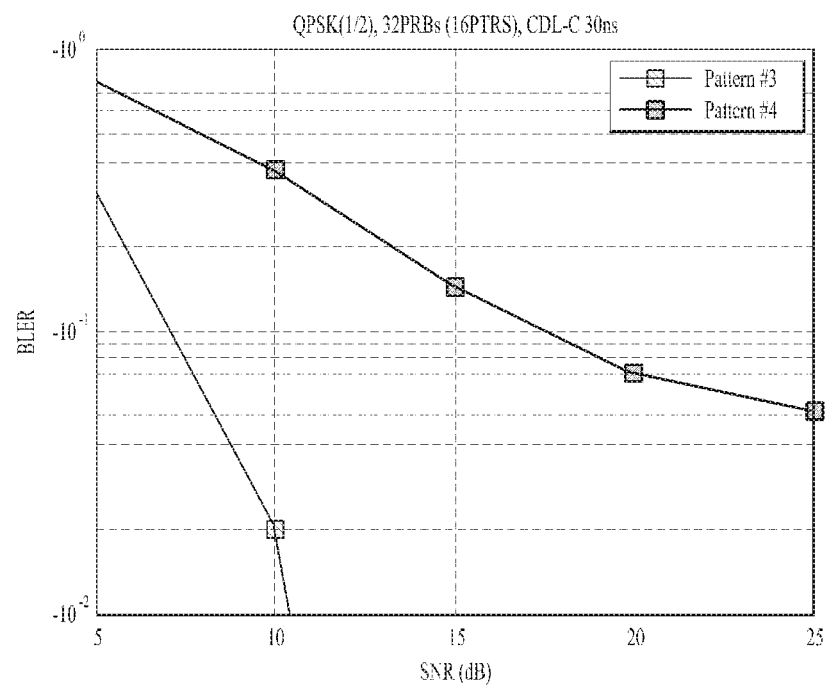
FIG. 9 is a diagram illustrating BLER performance measured based on PTRSs.

FIG. 9 shows elements that impact BLER performance when both a phase offset and a phase noise exist. It can be seen from FIG. 9 that the BLER performance significantly varies depending on different PTRS patterns. That is, when both the frequency offset and phase noise exist, BLER performance degradation can be determined according to PTRS patterns.

FIG. 10 shows spectral efficiency according to MCS levels. Referring to FIGS. 10(a) and 10(b), it can be seen that in the case of QPSK (½) and 16 QAM (¾), patterns #1, #2 and #3 shown in FIG. 7 achieve high spectral efficiency regardless of PRB sizes. That is, high spectral efficiency can be achieved because the phase noise impact can be negligible at a low MCS level. For example, considering RS overhead, pattern #3 can achieve high spectral efficiency due to a small PRB size in FIG. 10(a).

FIG. 11 shows spectral efficiency according to MCS levels. Referring to FIG. 11(a), it can be seen that in the case of 4 PRBs, patterns #1, #2 and #3 shown in FIG. 7 achieve high spectral efficiency regardless of PRB sizes. That is, high spectral efficiency can be achieved because the phase noise impact can be negligible at a low MCS level. For example, considering RS overhead, pattern #3 can achieve high spectral efficiency due to a small PRB size in FIG. 11(a).

Referring to FIG. 11(b), it can be seen that in the case of 64 QAM (⅚) and 32 PRBs, patterns #1 and #2 achieve high spectral efficiency. This is because since in the case of 32 PRBs, several codeblocks are defined in a codeword, and each codeblock spreads out in one or two OFDM symbols, the phase noise may be significantly affected thereby. That is, as described above, when transmission is performed based on a high MCS level and a large PRB size, it may further affect the phase noise.

In this case, for example, each UE can use a PTRS in performing uplink transmission. However, when there are a plurality of UEs, that is, in the case of UL MU-MIMO transmission, RS overhead may increase as the number of UEs increases. Thus, when the MCS level and PRB size are low and small, it should be determined whether the PTRS will be used, by considering the RS overhead.

As another example, in downlink transmission, since repeatedly transmitted signals (e.g., PSS, SSS) or channels (e.g., PBCH) are already designed, a CFO can be estimated in advance of data reception. Thus, the PTRS pattern for a high MCS level and a large PRB size can be configured before data reception. However, the present disclosure is not limited thereto.

Proposal 1 (Fixing Number of PTRSs in Frequency Domain)

Referring to the drawings, it can be seen that when the number of PTRSs in the frequency domain is 4 or 8, a BLER performance curve approaches that in the ideal case. That is, the number of PTRSs in the frequency domain can be determined irrespective of the number of TRBs (or TRB size). In other words, the number of PTRSs in the frequency domain can be fixed to a specific value regardless of the number of TRBs.

Specifically, assuming that the number of PTRSs in the frequency domain is N, N can be defined as follows 1. N is determined as 4 or 8 regardless of the number of TRBs (N can be defined as a rule in the specification).
2. The value of N is informed through RRC and/or DCI.

That is, the number of PTRSs in the frequency domain may be determined as a predetermined specific value, for example, 4 or 8. For example, the number of PTRSs in the frequency domain can be informed through RRC or DCI in advance. In this case, the above-described methods can be used by considering overhead caused by the PTRS as a reference signal.

FIG. 12 is a diagram illustrating PTRS arrangement methods. For example, in FIG. 12, the number of PTRSs in the frequency domain may be 4. In this case, a distributed type of PTRS and a localized type of PTRS can be used. For example, the distributed type means to design a frequency interval between PTRSs to be uniform within a given TRB. On the other hand, the localized type means to locate PTRSs at the center of the given TRB or a specific position.

In this case, for example, a BS may inform a UE whether the distributed type or the localized type is used through RRC and/or DCI. Alternatively, one type may be defined by a predetermined arrangement method (one of the types may be defined as a rule in the specification). In addition, for uplink transmission, control information may be signaled together, or a predetermined arrangement method may be used. However, the present disclosure is not limited thereto.

As another example, the number of PTRSs in the frequency domain may be changed by considering TRB sizes. This is because ICI caused by a CFO degrades performance of CFO and CPE estimation. In this case, as shown in the drawings, as the number of TRBs increases, the estimation performance is degraded, and thus the BLER performance may be degraded as well. However, since RS overhead decreases as the number of TRBs increases, it is possible to improve the estimation performance by allocating more PTRSs in the frequency domain. That is, the number of PTRSs in the frequency domain can be determined based on the number of TRBs by considering the BLER performance degradation and PTRS overhead. For example, the number of PTRSs can be defined as shown in Table 3. According to Table 3, when the number of TRBs (or TRB size) is equal to or smaller than N, the number of PTRSs in the frequency domain may be set to M1. On the contrary, when the number of TRBs is greater than N, the number of PTRSs in the frequency domain may be set to M2. In this case, for instance, the reference number of TRBs may be 8. In addition, M1 and M2 may be 4 and 8, respectively. However, the present disclosure is not limited thereto, and other specific values can also be used.

Additionally, N, M1, and M2 can be configured through RRC and/or DCI. Further, N, M1, and M2 may be predetermined (values thereof may be defined as a rule in the specification).

TABLE 3

If TRB size <= N (e.g. 8)
　　# of PTRS in the frequency domain = M1 (e.g., 4)
Else
　　# of PTRS in the frequency domain = M2 (e.g., 8)

Proposal 2 (Changing Interval between PTRSs in Time Domain According to TRB Size)

Spectral efficiency can vary depending on PTRS intervals in the time domain.

Specifically, it can be seen from FIG. 3 that when the TRB size is 4, interval 2 has better spectral efficiency than interval 1. On the other hand, it can be seen that when the TRB size is 64, interval 1 has better spectral efficiency than interval 2. That is, as described above, as the TRB size decrease, the impact of RS overhead increases because throughput loss caused by the RS overhead may be greater than gain coming from CPE compensation. On the contrary, as the TRB size decreases, the spectral efficiency can be improved due to decrease in the RS overhead and increase in the gain from the CPE compensation.

In this case, for example, a PTRS interval in the time domain can be defined as shown in Table 4 below. Specifically, when the TRB size is equal to or smaller than N, the PTRS interval in the time domain may be set to M1. On the contrary, when the TRB size is greater than N, the PTRS interval in the time domain may be set to M2. In this case, M1 may be greater than M2. For instance, M1 and M2 may be set to 2 and 1, respectively, and N may be set to 8.

In other words, when the TRB size is small, it is possible to increase the PTRS time interval by considering PTRS overhead. In contrast, when the TRB size is large, the PTRS time interval may be reduced by considering the CPE compensation.

Additionally, N, M1, and M2 can be configured through RRC and/or DCI. Further, N, M1, and M2 may be predetermined (values thereof may be defined as a rule in the specification).

TABLE 4

If TRB size <= N (e.g., 8),
    PTRS time interval = M1 (e.g., 2)
Else
    PTRS time interval = M2 (e.g., 1)

As another example, a Code Rate (CR) and a Modulation Order (MO) may be further considered in determining the PTRS interval in the time domain. That is, the PTRS time interval can be determined by the TRB size, CR, and/or MO.

In FIG. 4(c), the MO and CR may be set to 64 QAM and 5/6, respectively. For example, if the MO and/or CR increases, the PTRS time interval may decrease from 2 to 1. In this case, Table 4 above can be modified as shown in Table 5 below by considering the MO and CR.

For instance, "If CR<=M (e.g. 5/6)" shown in Table 5 may be configured based on the MO, but the present disclosure is not limited thereto. That is, even when the MO and/or CR increases, the PTRS time interval may decrease even if the TRB size is small, but the present disclosure is not limited thereto.

TABLE 5

If TRB size <= N (e.g., 8)
    If CR <= M (e.g., 5/6)
        PTRS time interval = 2
    Else
        PTRS time interval = 1
Else
    PTRS time interval = 1.

As another example, the PTRS can be used for CFO estimation. In this case, a BS may determine a random PTRS time interval and then signal to the UE the determined PTRS time interval. Alternatively, if only the CFO estimation is performed, the PTRS time interval may be predetermined between a transmitter and a receiver, and if necessary, only ON/OFF of the PTRS time interval may be signaled through DCI.

Figure 13:
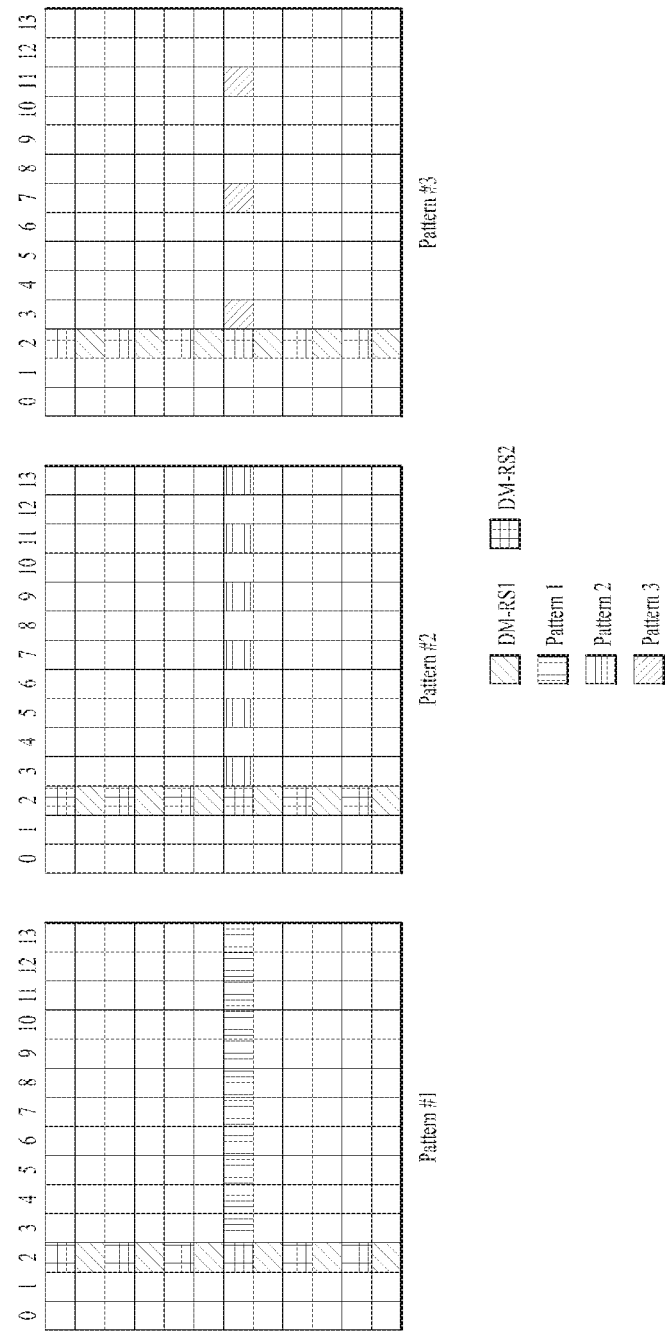
FIG. 13 is a diagram illustrating different PTRS patterns according to MCSs and PRBs.

FIG. 13 is a diagram illustrating different PTRS patterns according to MCS levels and PRB sizes as particular embodiments related to PTRS arrangement in the time domain.

Specifically, FIG. 13 shows a case where PTRS patterns are defined according to different MCSs and PRBs, and patterns #1 to #3 may correspond to conditions 1 to 3 below. Meanwhile, the following mapping method may be configured for the UE through RRC and/or DCI or determined as a rule.

Regarding the following conditions, pattern #1 may have the shortest interval, and pattern #3 may have the longest interval. That is, when the MCS level is high and the PRB size is large, the PTRS time interval can be shortened. On the other hand, when the PRB size is small even though the MCS level is high, the PTRS timer interval may increase. In addition, when the MCS level is low and the PRB size is small, the longest PTRS time interval may be configured. That is, as described above, as both of the PRB size and MCS level increases, the PTRS time interval may decrease. Based on this feature, different TRB patterns may be configured according to MCS levels and PRB sizes, and each pattern can be defined by considering the PTRS overhead.

1. High MCS (e.g., #26)+large PRB (e.g., 32 PRBs): Pattern 1
2. High MCS (e.g., #26)+middle PRB (e.g., 8 PRBs): Pattern 2
3. Low MCS (e.g., #16) or small PRB (e.g., 4 PRBs): Pattern 3

Proposal 3 (PTRS Mapping in Accordance with TRB Size)

PTRS mapping methods can be determined according to TRB sizes. That is, either time-first mapping or frequency-first mapping may be used according to TRB sizes. For example, referring to FIG. 5, it can be seen that when data is mapped based on the time-first mapping, it is more robust to phase noise compared to the frequency-first mapping. That is, the phase noise impact can be reduced.

As described above, since only a single codeblock is defined in a codeword when the TRB size is small, the frequency-first mapping and time-first mapping have the same effects.

However, when the TRB size is large, the time-first mapping or code spreading in the time domain guarantees higher performance gain. Consequently, the PTRS mapping method should be considered when the TRB size is large, and it can be determined as shown in Table 6 below.

That is, when the TRB size is equal to or smaller than N, data can be mapped based on the frequency-first mapping. On the contrary, when the TRB size is greater than N, data can be mapped based on the time-first mapping, time-domain code spreading, or inter-CB interleaving. However, the present disclosure is not limited thereto.

For example, N may be set to 8. In this case, N may have a different value or defined as a predetermined value (it may be defined as a rule in the specification). Moreover, N may be configured through DCI and/or RRC. However, the present disclosure is not limited thereto.

In addition, in the case of an ultra-reliable and low latency communications (URLLC) service where decoding latency is very important, the frequency-first mapping can be always applied regardless of the value of N.

Moreover, when the code rate or modulation order decreases, performance degradation caused by the frequency-first mapping also decreases. Thus, in this case, N may be determined based on the TRB size, CR and/or MO. However, the present disclosure is not limited thereto.

TABLE 6

1. In the case of TRB size <= N (e.g., 8), frequency-first mapping is applied to data.
2. In the case of TRB size > N, time-first mapping, code spreading in the time domain,
or new code spreading is applied to data.

Proposal 4 (Method of Determining Whether PTRS Transmission Is Performed)

Whether a PTRS will be transmitted can be determined according to TRB sizes, BS capability, and/or UE capability.

FIG. 4 (a) shows that a case in which no PTRS is transmitted has better spectral efficiency than a case in which PTRS transmission is performed.

Meanwhile, FIG. 5 shows that when a CFO of 1.4 kHz occurs, communication fails if no PTRS is transmitted. In this case, the magnitude of the CFO may be changed according to oscillators, that is, the UE and BS capabilities. If the CFO magnitude is extremely small due to excellent oscillators of the UE and BS and if the TRB size is small, it is better not to transmit the PTRS for high spectral efficiency.

In other words, the PTRS transmission can be determined by the BS capability and UE capability as well as the TRB sizes. To this end, the UE may transmit information related to its CFO (e.g., oscillator, movement, speed, etc.) to the BS. Thereafter, the BS may determine whether the PTRS will be transmitted based on the information received from the UE and its capability information. However, the present disclosure is not limited thereto.

Hereinabove, the PTRS density in the frequency and time domains has been described. In the following description, PTRS arrangement methods will be explained.

Proposal 5 (PTRS Resource Allocation and Precoding Method)

PTRS resources can be defined by a Resource Block (RB) index and/or a symbol index. In this case, at least one of the defined PTRS resources may be configured for a UE through RRC and/or DCI. Alternatively, the selected PTRS resources may be signaled to the UE through DCI.

Figure 14:
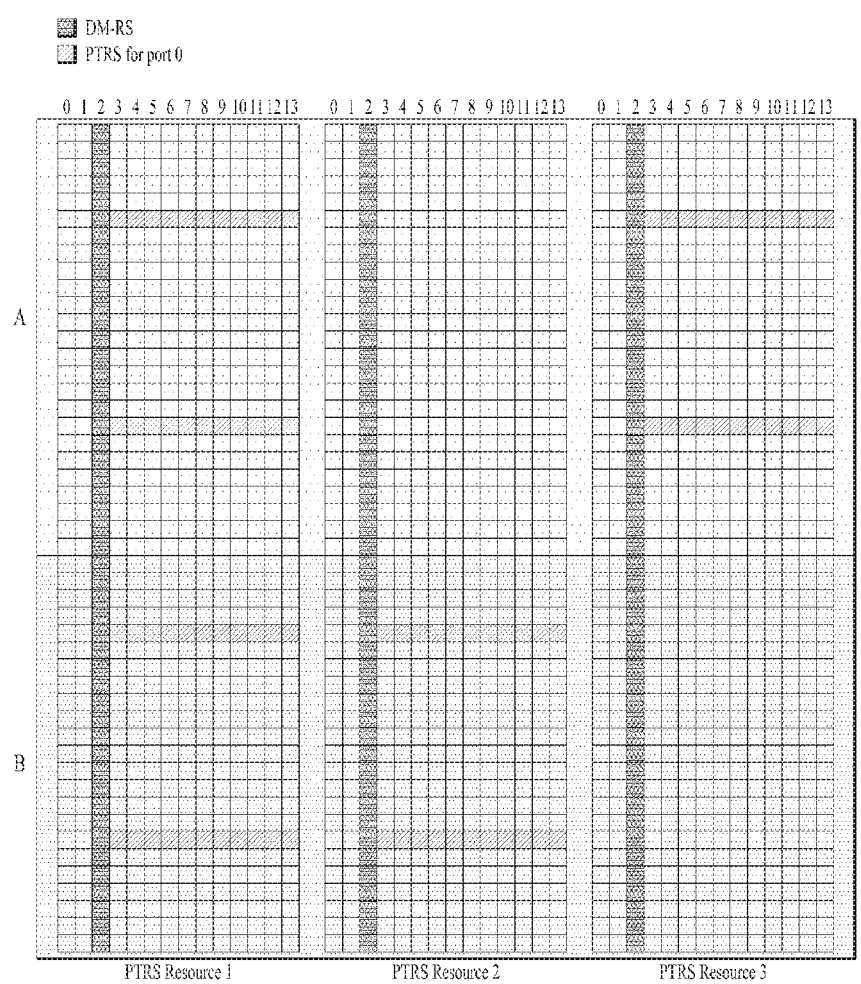
FIG. 14 is a diagram illustrating a method of allocating PTRS resources.

FIG. 14 illustrates a method of allocating PTRS resources. Referring to FIG. 14, there may be a plurality of PTRS resource sets. Specifically, FIG. 14 shows three PTRS resource sets. PTRS resource 1 may indicate a PTRS resource set where PTRSs are defined in both regions A and B. On the other hand, in PTRS resource 2, PTRSs are defined only in region A, and in PTRS resource 3, PTRSs are defined only in region B. Each PTRS resource set may be indicated by a RB index and/or a symbol index. In other words, by doing so, a resource set where PTRSs are defined can be indicated.

For example, a PTRS resource set may be configured for a UE through RRC. That is, information on a resource set that can be selected by a UE may be transmitted through RRC. Thereafter, a BS may inform the UE of currently used PTRS resources through DCI. In other words, information on a selectable resource set may be transmitted through RRC, and currently used resources in the selectable resource set may be indicated via DCI.

For example, if the UE is allocated RBs in region A and configured with PTRS resource 3, the UE may perform CPE estimation using PTRS resources in region A.

As another example, if the UE is configured with PTRS resource 2, the UE may perform the CPE estimation using PTRS resources in region B.

As a further example, if the UE is configured with PTRS resource 1, the UE may perform the CPE estimation more accurately using all PTRS resources in both regions A and B.

Meanwhile, assuming that the BS defines PTRS resource 2 as a subframe and the UE is allocated RBs in region B in a situation that the UE requires no CPE compensation, the BS may inform the corresponding UE of PTRS resources through DCI. In this case, the UE may obtain the locations of the PTRS resources from the DCI, and thus the UE may not use the PTRS resources as Resource Elements (REs) for data. If the UE is allocated the RBs in region A, the BS does not need to inform currently defined PTRS resources through DCI. In other words, by considering the selected PTRS resource set and the RB region allocated to the UE, the BS may signal to the UE information on the PTRS resources through DCI. However, the present disclosure is not limited thereto.

Proposal 5-1

When PTRS resources are arranged according to proposal 5, PTRS precoding can be equivalent to DMRS precoding applied to a corresponding RB.

Figure 15:
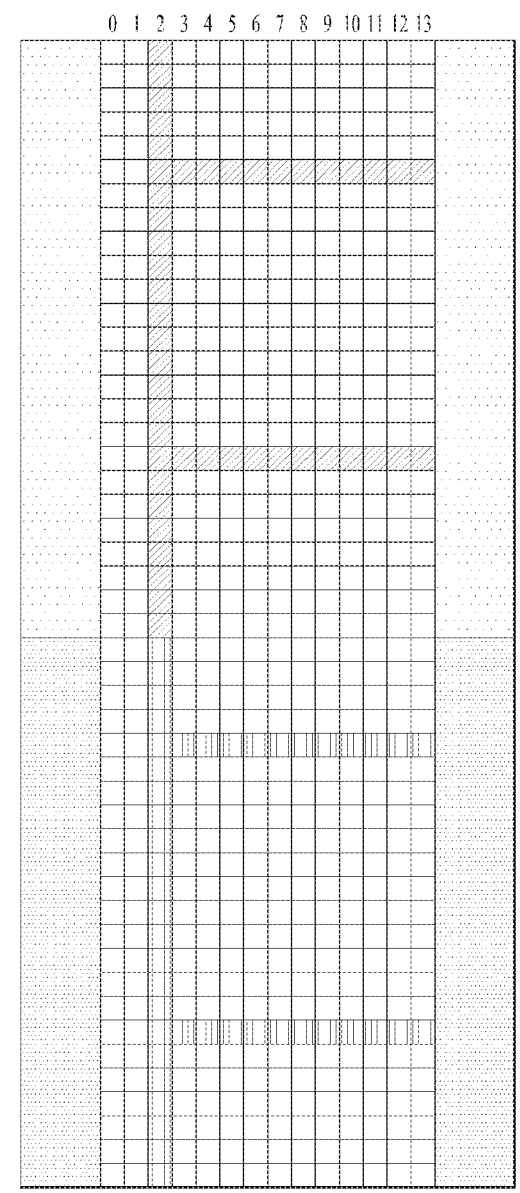
FIG. 15 is a diagram illustrating a method of applying a precoded PTRS.

Referring to FIG. 15, in the case of PTRS resource 1, DMRS precoding in region A may be applied to PTRS resources in region A and DMRS precoding in region B may be applied to PTRS resources in region B. That is, since a PTRS resource set can be configured based on a RB index as described above, it is possible to avoid unnecessary delay by designing that DMRS precoding is applied to each RB.

For example, UE 1 and UE 2 may be allocated region A and region B, respectively. In this case, PTRS precoding defined for regions A and B may be the same as DMRS precoding defined for regions A and B, respectively. If UE 1 is configured with PTRS resource 1, UE 1 can recognize that PTRSs are present in region B and thus perform CPE estimation more accurately using the PTRSs. That is, even when UE 1 is allocated region A, UE 1 can know the PTRSs existing in region B and perform the CPE estimation using the PTRSs in region B.

Meanwhile, if UE 2 is configured with PTRS resource 2, UE 2 cannot recognize that PTRSs are present in region A. Considering that UE 2 is configured to use only region B and PTRS resource 2 is a resource set where PTRSs are present only in region B, UE 2 may perform the CPE estimation using only the PTRSs defined in region B.

Proposal 5-2

In proposal 5-1, since the precoding in regions A and B are equivalent to the DMRS precoding in regions A and B, respectively, the precoding in region A may be identical to or different from that in region B (that is, if the DMRS precoding in regions A and B are the same, the same precoding may be applied).

Figure 16:
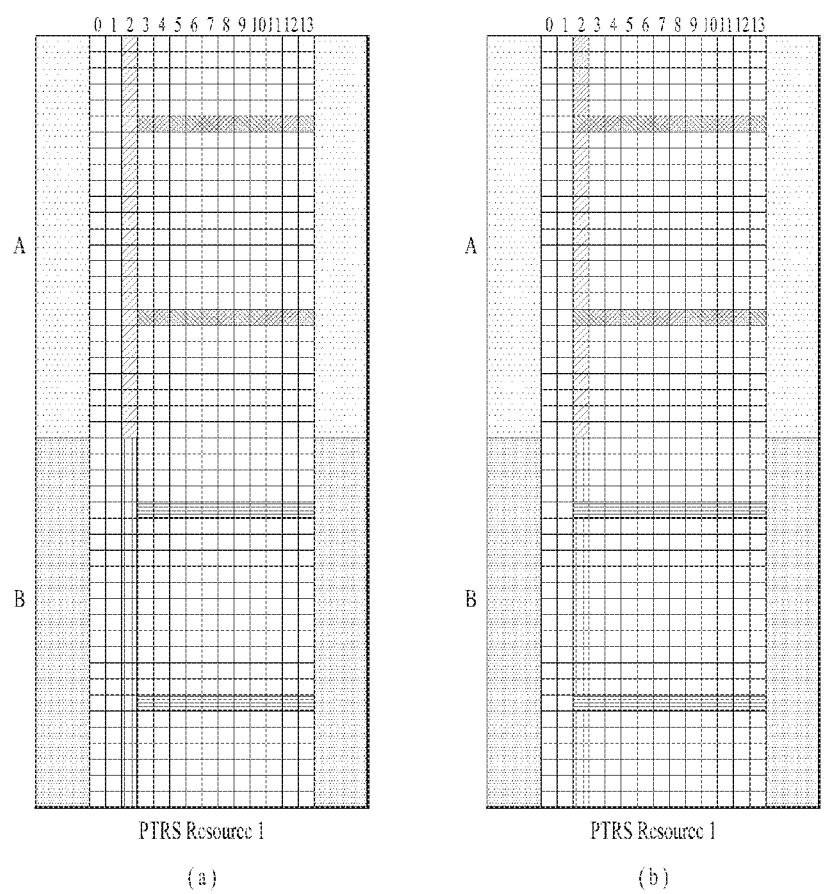
FIG. 16 is a diagram illustrating a method of applying a precoded PTRS.

However, as shown in FIG. 16 (a), the precoding in region A may be defined to be different from that in region B regardless of the DMRS precoding. According to proposal 5-2, different PTRS precoding can be defined for regions A and B, thereby obtaining spatial diversity during CPE estimation. In other words, different precoding can be applied to PTRSs in the individual regions regardless of the DMRS precoding.

As another example, some REs for DMRSs can be replaced with PTRSs as shown in FIG. 16(b). In this case, although CPE estimation performance between the second and third symbols is improved, DMRS-based channel estimation performance may partially decrease. Therefore, a reference signal can be determined by considering gains obtainable from the PTRS and DMRS resource arrangements, which are in a trade-off relationship. In this case, if phase noise significantly affects throughput, that is, if the CPE estimation is important, a PTRS can be allocated instead of a DMRS as described above.

Proposal 5-3

Figure 17:
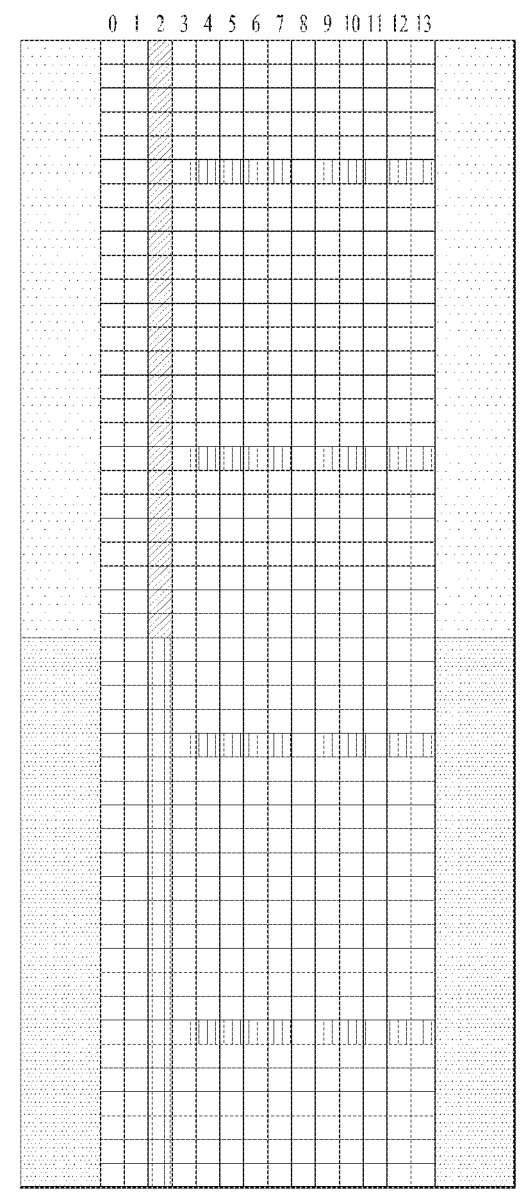
FIG. 17 is a diagram illustrating a method of applying a non-precoded PTRS.
Figure 22:
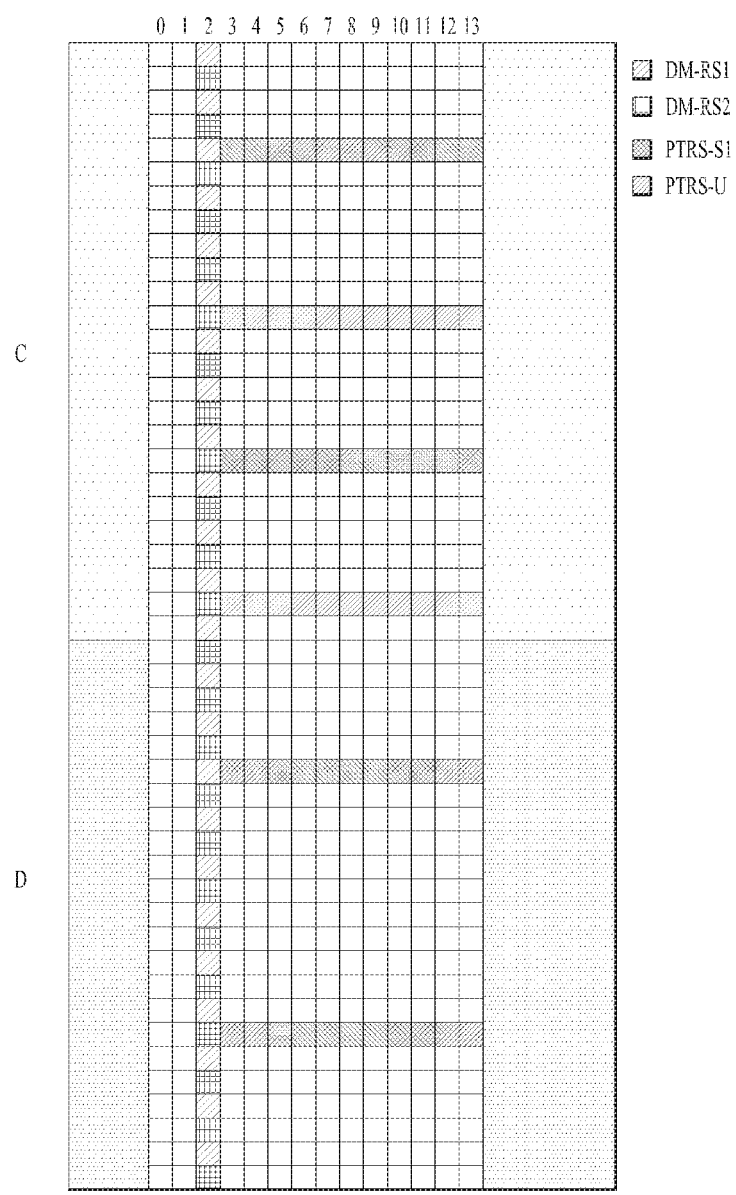
FIG. 22 is a diagram illustrating a method of arranging a shared PTRS and a UE-dedicated PTRS.

In contrast to the above-described proposals, all PTRSs can be defined such that no precoding is applied thereto. In this case, the PTRSs in regions A and B may be received with the same beam gain. That is, if the CPE estimation is performed based on PTRSs with the same beam gain in an environment where the impact of phase noise is significant, the PTRSs can be defined in the form of non-precoding and allocated as shown in FIG. 22. For example, in FIG. 17, some DMRS REs can be replaced with non-precoded PTRSs, but the present disclosure is not limited thereto.

In the above-described proposals, precoding schemes can be configured through RRC. For example, when PTRS resources are configured through RRC as described above, information on a specific one among the precoding schemes described in proposals 5-1 to 5-3 may be configured through RRC. However, the present disclosure is not limited thereto.

That is, a UE can receive information on a PTRS resource configuration and information on a PTRS precoding scheme from a BS. However, the present disclosure is not limited thereto.

Proposal 6 (Shared PTRS and UE-dedicated PTRS)

A PTRS can be classified into a shared PTRS and a UE-dedicated PTRS.

More specifically, a BS can configure for a UE one or more shared-PTRS patterns through RRC and/or DCI. After selecting one of the configured patterns, the BS may inform the UE of the selected pattern through RRC and/or DCI. Moreover, the BS may inform the UE of a UE-dedicated PTRS through RRC and/or DCI. In other words, the shared PTRS and the UE-dedicated PTRS may be used independently.

Figure 18:
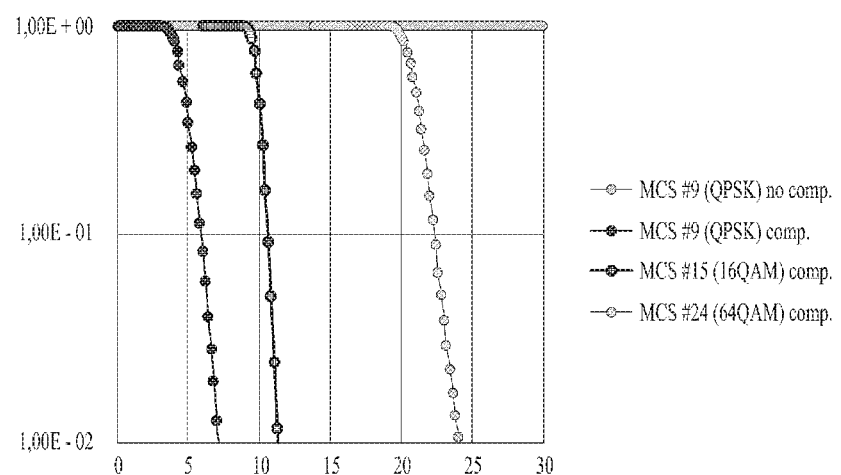
FIG. 18 is a diagram illustrating performance of PTRS-based CFO compensation at different MCSs.

FIG. 18 illustrates performance of PTRS-based CFO compensation at different MCSs. Specifically, FIG. 18 shows performance differences between a case where PTRS-based CFO compensation is performed and a case where there is no PTRS-based CFO compensation at MCSs #9, 15, and 24 when a CFO is 3 kHz. Referring to FIG. 18, it can be seen that when no PTRS-based CFO compensation is performed, a BLER is set to 1 regardless of MCS levels. Although FIG. 18 shows the BLERs when the compensation is performed and not performed at only MCS #9, the BLER when the compensation is not performed may be set to 1 even at a higher MCS.

In this case, a jitter in the time domain may appear as phase noise in the frequency domain. This phase noise randomly changes the phase of a received signal in the time domain as shown in Equation 1 below.

$$r_n = s_n e^{j\phi_n} \quad \text{[Equation 1]}$$

$$\text{where } s_n = \sum_{k=0}^{N-1} d_k e^{j2\pi \frac{kn}{N}}$$

In Equation 1, the parameters $r_n$, $s_n$, $d_k$, and $\phi_n$ indicate a received signal, a time-domain signal, a frequency-domain signal, and a phase rotation value due to phase noise, respectively. When the Discrete Fourier Transform (DFT) process is applied to the received signal in Equation 1, Equation 2 below can be obtained.

$$y_k = d_k \frac{1}{N} \sum_{n=0}^{N-1} e^{j\phi_n} + \frac{1}{N} \sum_{\substack{t=0 \\ t \neq k}}^{N-1} d_t \sum_{n=0}^{N-1} e^{j\phi_n} e^{j2\pi(t-k)n/N} \quad \text{[Equation 2]}$$

In Equation 2, the parameters $$\frac{1}{N} \sum_{n=0}^{N-1} e^{j\phi_n} \text{ and } \frac{1}{N} \sum_{\substack{t=0 \\ t \neq k}}^{N-1} d_t \sum_{n=0}^{N-1} e^{j\phi_n} e^{j2\pi(t-k)n/N}$$

indicate common phase error (CPE) and inter-cell interference (ICI), respectively. In this case, as phase noise correlation increases, the value of the CPE in Equation 2 increases. Such CPE can be regarded as kind of a CFO in a WLAN system, and thus from the perspective of the UE, the CPE could be interpreted similar to the CFO in terms of the phase noise.

Referring again to FIG. 18, when a CFO is 3 kHz, the PTRS needs to be defined for CFO estimation at a low MCS. Meanwhile, the CFO has the same value within one subframe (i.e., during a short time period). That is, if the CFO estimation is required in spite of an increase in PTRS overhead, the PTRS-based CFO estimation can improve throughput. Hereinafter, the PTRS-based CFO estimation will be described in detail.

Figure 19:
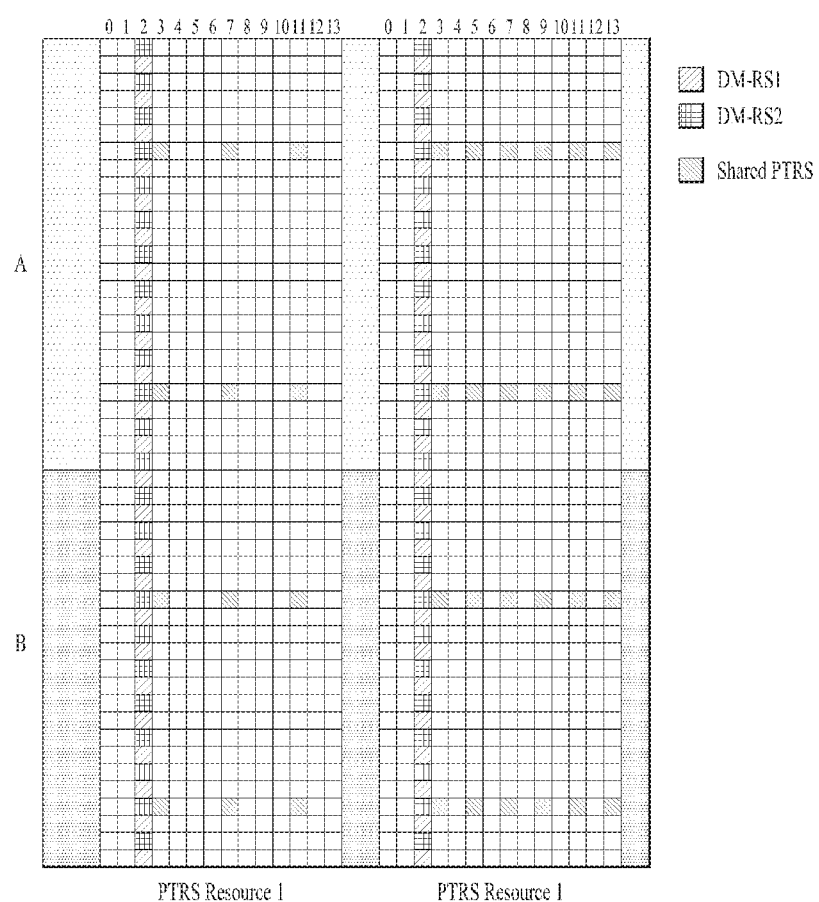
FIG. 19 is a diagram illustrating different types of shared PTRSs.

Referring to FIG. 19, it can be seen that there are different types of shared PTRSs. Specifically, FIG. 19 shows shared-PTRS type 1 and shared-PTRS type 2. In PTRS type 1, three PTRSs may be defined in the time domain, and in PTRS type 2, six PTRSs may be defined in the time domain.

Meanwhile, a shared PTRS may mean an RS available to all UEs that receive the RS. For example, when resource A is configured for UE A1, UE A1 may also use a PTRS defined in resource B. In this case, since the PTRS is mainly used for the CFO estimation, its spacing in the time domain may be sparse.

Meanwhile, a BS may configure both shared-PTRS type 1 and shared-PTRS type 2 for a UE through RRC and signal to the UE through DCI or RRC that one of them is available.

As another example, there may be only a single type of shared PTRS. In this case, the BS may configure ON/OFF of transmission of the single type of PTRS through RRC and/or DCI, but the present disclosure is not limited thereto.

Figure 20:
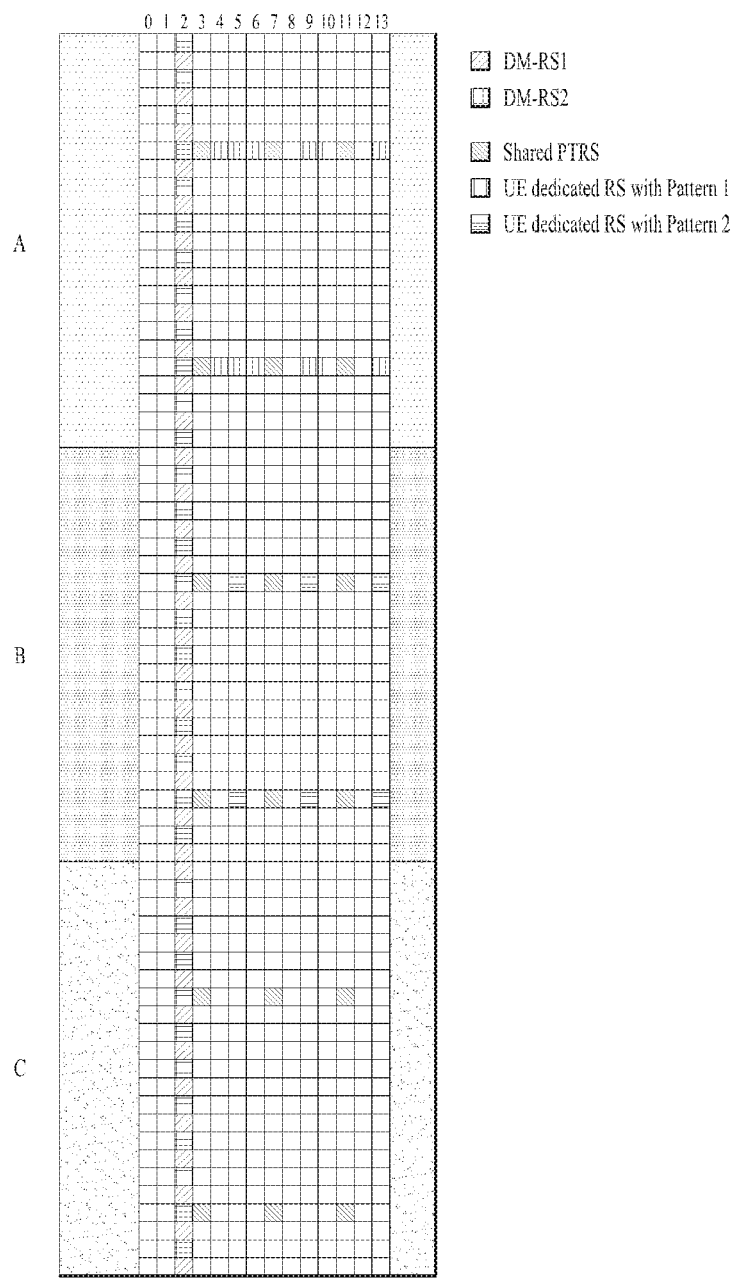
FIG. 20 is a diagram illustrating a method of allocating UE-dedicated PTRSs

FIG. 20 illustrates a method of allocating UE-dedicated PTRSs.

In FIG. 20, shared-PTRS type 1 illustrated in FIG. 19 is used. In this case, for example, MCS #26 may be configured for UE A1 allocated resource A, MCS #16 may be configured for UE B1 allocated resource B, and MCS #9 may be configured for UE C1 allocated to resource C.

Since UE C1 has almost no phase noise impact due to the low MCS, UE C1 may estimate a CFO using only a shared PTRS and then compensate for the CFO. On the other hand, since UE A1/B1 is significantly affected by phase noise, a BS may transmit a UE-dedicated PTRS with pattern 1 and a UE-dedicated PTRS with pattern 2 to UE A1/B1 to allow the UEs to estimate the phase noise. In this case, the BS may signal to the UEs the patterns through RRC and/or DCI.

That is, in FIG. 20, shared-PTRS types are configured for individual UEs through RRC, and each UE-dedicated PTRS is signaled to each UE through RRC and/or DCI.

As another example, the UE-dedicated PTRS can be implicitly allocated according to MCS levels or/and TRB sizes. In this case, even if there is no extra signaling, each UE can assume that the UE-dedicated PTRSs with patterns 1 and 2 are has been transmitted.

For example, each UE may assume that pattern 2 and pattern 1 are transmitted at MCSs #16 and #26, respectively. Alternatively, each UE may assume that pattern 2 and pattern 1 are transmitted with TRB sizes of 4 and 32, respectively. However, the above-described MCS levels and TRB sizes are merely examples, and thus these values may vary (the mapping relationship may be determined as a rule in the specification or configured through RRC).

When the TRB size or MCS level decreases, the phase noise impact decreases, and thus the PTRS density can also decrease. That is, UE-dedicated PTRSs having different time density may be used depending on TRB sizes or MCS levels, and such a UE-dedicated PTRS may be configured for a UE through RRC and/or DCI. Further, the UE-dedicated PTRSs may be implicitly determined according to MCS levels or TRB sizes.

As another example, only a single type of UE-dedicated PTRS may be defined, and ON/OFF thereof may be determined according to MCS levels or TRB sizes. The single type of UE-dedicated PTRS may be implicitly indicated through RRC and/or DCI, but the present disclosure is not limited thereto.

FIG. 21 illustrates a method of indicating whether a shared PTRS is transmitted or not by defining it as one type. That is, each of the fact that the shared PTRS is transmitted and the fact that the shared PTRS is not transmitted in all OFDM symbols may be defined as one type. In other words, these two facts can be set as the types described above with reference to FIG. 19. For instance, the fact that the shared PTRS is not transmitted may be configured and included as the type configured through RRC in FIG. 19. In this case, information on the type may be signaled to a UE through RRC and/or DCI.

As another example, when a single type of shared PTRS is used, the above-described configuration may be applied in a similar manner That is, each of the fact that the single type of shared PTRS is configured and the fact that the single type of shared PTRS is not configured may be defined as one type, and these types can be set through RRC. In addition, ON/OFF of transmission may be indicated through RRC and/or DCI as described above.

In FIGS. 19 to 21, a suitable PTRS may be allocated to each UE by considering each UE's situation. For example, since UE C1 can sufficiently estimate and compensate for its CFO using the sparse PTRS, the RS overhead of UE C1 can be minimized However, although the RS overhead of UE A1 is expected to be large, UE A1 can overcome its CPE using a PTRS allocated thereto. In this case, CFO estimation may be performed using a shared PTRS. Alternatively, CPE and CFO estimation may be performed using a UE-dedicated PTRS. That is, a different PTRS may be allocated by considering each UE's situation.

Meanwhile, a shared PTRS may be intermittently signaled to a UE through RRC. By doing so, unnecessary signaling can be minimized That is, since in the case of UE C1 using the low MCS, the UE-dedicated PTRS does not need to be separately configured through DCI, it is possible to reduce unnecessary signaling through intermittent signaling.

Referring to FIG. 22, it can be seen that a shared PTRS and a UE-dedicated PTRS are arranged in a manner different from that described above. In FIG. 22, PTRS-S1 and PTRS-U indicate the shared PTRS and the UE dedicated PTRS, respectively. Assuming that DMRS-1 and DMRS-2 have the same phase source, a UE can perform CPE estimation in each OFDM symbol using PTRS-S1.

For example, if only region C is allocated to the UE and precoding applied to region C is different from that applied to region D, the corresponding UE may not obtain sufficient estimation performance from PTRS-S2 existing in region D. To improve the PTRS estimation performance of the corresponding UE, PTRS-U can be additionally configured.

As another example, if DM-RS2 comes from another TRP, the phase source may be changed. To handle this case, a separate PTRS needs to be defined. Here, PTRS-U may act as the separate PTRS for DM-RS2.

In other words, when PTRS-S1 cannot guarantee sufficient estimation performance or when a separate PTRS is required, PTRS-U may be allocated and used.

Proposal 6-1 (Method of Managing Shared PTRS)

A shared PTRS can be managed periodically, semi-persistently, and/or aperiodically. In this case, how the PTRS is managed may be signaled through RRC and/or DCI.

For example, the shared PTRS can be managed periodically. In this case, a BS can inform a UE of the type of the shared PTRS (e.g., PTRS time-domain/frequency-domain pattern, period, etc.) through cell-specific RRC (e.g., SIB). For example, the shared PTRS may be defined cell-specifically. The UE checks the location and period of the shared PTRS based on information obtained from the cell-specific RRC and then performs CFO and CPE estimation using the location and period of the shared PTRS. That is, as cell-specific information, the shared PTRS may be transmitted at all times based on the predetermined location and period.

Meanwhile, the BS can change the location and period of the shared PTRS using an SIB and then transmit information on the change to the UE implicitly or explicitly. Here, explicit signaling means that the BS informs the UE whether the SIB is changed through different signaling, and implicit signaling means that the UE confirms whether the SIB is changed by checking the SIB periodically. That is, the information on the shared PTRS may be transmitted to the UE according to whether it is changed or not.

As another example, the shared PTRS can be used semi-persistently. In this case, the BS may inform the UE of at least one shared PTRS type through UE-specific or cell-specific RRC. Thereafter, the BS may inform the UE of one shared PTRS type and whether it is transmitted through DCI or/and UE-specific RRC.

If the transmission is enabled (by activation signaling), the shared PTRS may be continuously and periodically transmitted until there is no separate signaling (deactivation signaling).

The semi-persistent shared-PTRS transmission is different from the periodic shared-PTRS transmission in that whether the shred PTRS is transmitted or not is determined through RRC or/and DCI. Thus, the BS can manage the shared PTRS more flexibly with the minimum overhead.

In the periodic shared-PTRS transmission, the shared PTRS is RRC-configured, and it can be periodically transmitted regardless of whether it is activated or deactivated. Thus, a UE can assume that the shared PTRS is periodically transmitted. On the other hand, in the semi-persistent shared-PTRS transmission, the activation or deactivation of the shared PTRS needs to be determined, and which one of the PTRS types indicated through RRC will be used also needs to be determined.

As a further example, the shared PTRS can be transmitted aperiodically. More specifically, the periodic or semi-persistent shared-PTRS transmission may cause a decrease in throughput. To minimize the decrease in the throughput, the BS may aperiodically transmit information on the type of the shared PTRS and/or information on whether the shared PTRS is transmitted to the UE through DCI.

In this case, the PTRS type may be preconfigured through RRC to minimize CI overhead. Further, the BS may transmit information on the determined PTRS type and information on whether the PTRS is transmitted to the BS through DCI only when the PTRS transmission is necessary. By doing so, the throughput reduction can be minimized Since the aperiodic transmission may increase the DCI overhead, one of the periodic transmission, semi-persistent transmission, and aperiodic transmission may be selectively used by considering the system. However, the present disclosure is not limited thereto.

Proposal 6-2 (Method of Indicating PTRS Allocation Information When Multiple UEs Are Allocated Same Resource)

In the above-described PTRS allocation, a plurality of UEs may be allocated the same resource. Specifically, the same resource may be allocated to two or more UEs. If a UE-dedicated PTRS should be allocated to at least one UE among the plurality of UEs, a BS can inform all UEs configured with the same resources that the UE-dedicated PTRS is allocated.

For example, it is assumed that in FIG. 19, resource A is allocated to UE A1 and UE B1. In addition, it is assumed that the UE A1's MCS level and the UE B1's MCS level are MCS #26 and MCS #9, respectively. That is, one UE may have a high MCS level, and another UE may have a low MCS level. However, the present disclosure is not limited to the specific values.

In this case, PTRS-U can be allocated to UE A1 by considering its high MCS level. As a result, UE B1 may be unable to use REs where PTRS-U is allocated in transmitting and receiving data. Thus, the BS may signal not only to UE A1 but also to UE B1 that the PTRS-U has been allocated. In this case, the BS may signal to the two UEs through RRC and/or DCI that PTRS-U has been transmitted. By doing so, it is possible to prevent UE B1 from using the REs where PTRS-U is allocated for data transmission and reception.

Proposal 6-3 (Precoding Method for Shared PTRS)

As described above, DMRS precoding, independent precoding, or non-precoding can be used as PTRS precoding. This configuration can be equally applied to a shared PTRS. That is, shared-PTRS precoding may be defined to be equivalent to DMRS precoding. Alternatively, the shared PTRS may use d precoding. Further, no precoding may be applied to the shared PTRS. The methods described above with reference to FIGS. 15 to 17 can be equally applied to the shared PTRS.

For example, the shared PTRS may be configured for each cell. In this case, the shared PTRS configured for each cell may have a different resource location in the frequency and time domains. The resource location of the shared PTRS in the frequency and time domains may be determined by either or both of RRC and a cell ID. Details will be described later.

As another example, the shared PTRS may have the same precoding as that for a DMRS located in the same frequency domain. In this case, the shared PTRS may be defined in one OFDM symbol.

As still another example, the shared PTRS may have precoding different from that for a DMRS located in the same frequency domain. In this case, the shared PTRS may be defined in two OFDM symbols in the time domain. Details will be described later.

As a further example, when a plurality of shared-PTRS patterns are configured for a UE, the shared-PTRS patterns may be configured through either or both of RRC and DCI. In this case, information indicating one of the shared-PTRS patterns configured for the UE may be additionally configured through either or both of the RRC and DCI.

Proposal 7 (Method of Defining Shared PTRS in Different Cell)

Figure 23:
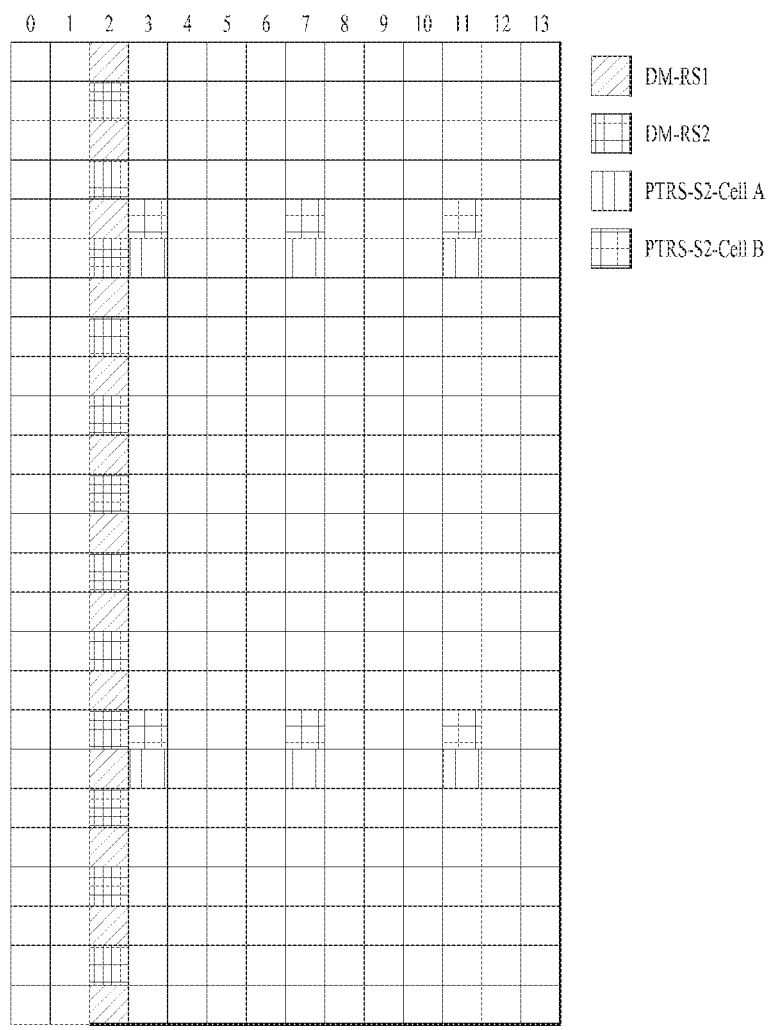
FIG. 23 is a diagram illustrating a method of allocating shared PTRSs for different cells.

In the shared-PTRS allocation, shared PTRSs for neighboring cells need to be designed such that they do not overlap with each other. FIG. 23 illustrates a method of allocating shared PTRSs for different cells. Specifically, FIG. 23 shows that each of cell A and cell B is allocated a cell-specific (or UE-specific) shared PTRS at a different location. The shared PTRSs can be power-boosted, and in this case, the shared PTRSs for the neighboring cells need to be designed such that they do not overlap with each other. By doing so, it is possible to reduce the impact between the PTRSs for the neighboring cells.

For example, a BS may define the shared PTRS at a location different from that used by another BS and then RRC-configure the defined shared-PTRS. In this case, although there is additional signaling overhead, the BS needs to configure the location of the shared PTRS per cell by considering the impact on a neighboring cell.

As another example, the location of the shared PTRS may be determined based on a cell ID as in the case of a CRS. A frequency-domain offset location may be determined in the following: cell ID % 12.

It is assumed that cell IDs of cells A and B are 126 and 127, respectively. In this case, frequency-domain offset locations of cell A and B are 6 and 7, respectively. In FIG. 23, the shared PTRSs are allocated by considering these frequency-domain offset locations. In this case, although the BS cannot configure the shared-PTRS locations, signaling therefor is not required so that signaling overhead can be reduced.

As a further example, a cell can be replaced with a TRP. If different TRPs belong to one cell (the TRPs share a single cell ID), the location of a shared PTRS for each TRP may be configured for a UE through RRC or/and DCI. However, the present disclosure is not limited thereto.

Figure 24:
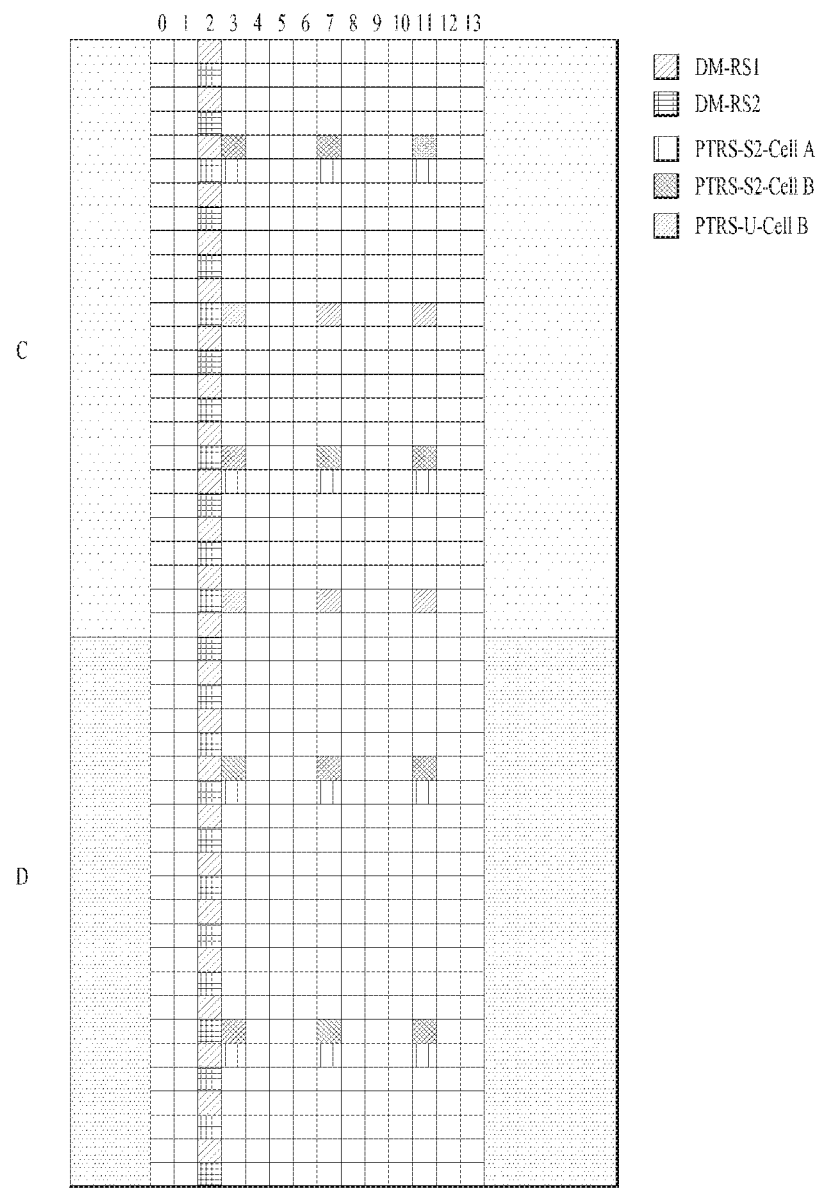
FIG. 24 is a diagram illustrating a PTRS allocation method based on multi-cell transmission.

FIG. 24 illustrates a PTRS allocation method based on multi-cell transmission. In FIG. 24, resource C may be allocated to UE A1, and cell A and cell B may be a serving cell and an additional cell (i.e., non-serving cell), respectively. In this case, UE A1 may use PTRS-S2-Cell A, which is defined in cell A. However, regarding PTRS-S2-Cell B of cell B, only a shared PTRS defined in resource C may be used. In addition, UE A1 may not use PTRS-S2-Cell B defined in resource D. That is, the shared PTRS for the serving cell can be completely used, whereas the shared PTRS for the non-serving cell may be used limitedly in an allocated resource region.

In this case, considering performance degradation caused by restriction on use of the shared PTRS, PTRS-U-Cell B may be additionally allocated to a UE. That is, it is possible to overcome the performance degradation by additionally allocating a UE-dedicated PTRS for cell B. In this case, PTRS-U Cell B may be allocated to the UE through RRC or/and DCI.

Figure 25:
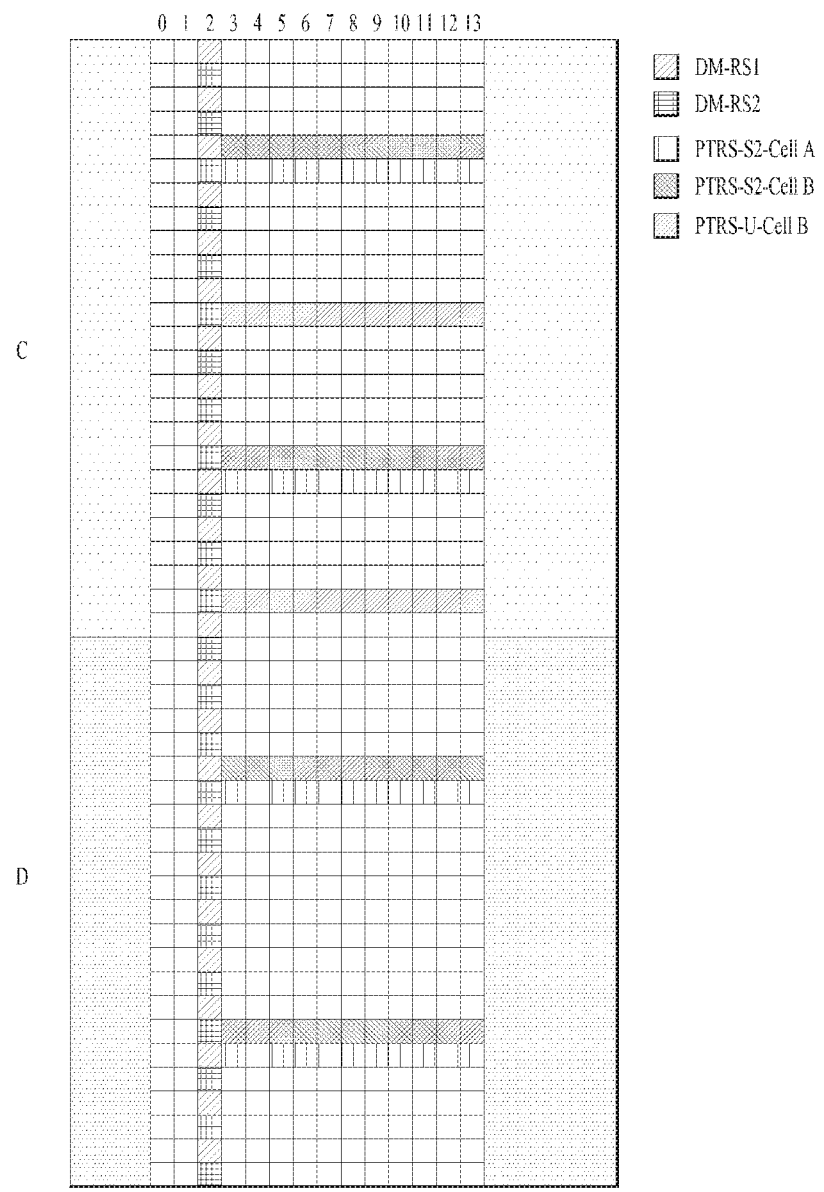
FIG. 25 is a diagram illustrating that shared PTRSs are defined over the entire time domain.

It can be seen from FIG. 25 that shared PTRSs are defined over the entire time domain. Specifically, although FIG. 25 is similar to FIG. 24 in that shared PTRSs are used for multiple cells and a UE-dedicated PTRS is additionally allocated, FIG. 25 is different from FIG. 24 in that PTRSs can be defined over the entire time domain for efficient CPE estimation. When PTRSs are defined over the entire time domain, a phase change can be measured in each OFDM symbol, thereby improving CPE estimation and compensation.

In summary, PTRSs can be used for multiple cells, and different time-domain PTRS density can be configured by considering CPE estimation performance. However, the present disclosure is not limited thereto.

Proposal 8 (Method of Determining Time-domain Locations of Shared PTRSs for Different Cells)

In different cells, the time-domain location of a shared PTRS can be next to that of a DMRS. If the shared PTRS uses the same precoding as the DMRS, the shared PTRS may be defined on only one column in the time domain.

In FIGS. 23 and 24, shared PTRSs may be located at OFDM symbols spaced at a constant interval. If a shared PTRS is simply used for CFO estimation, the shared PTRS can be defined in the third OFDM symbol, which is located apart from the DMRS symbol by two symbols.

Figure 26:
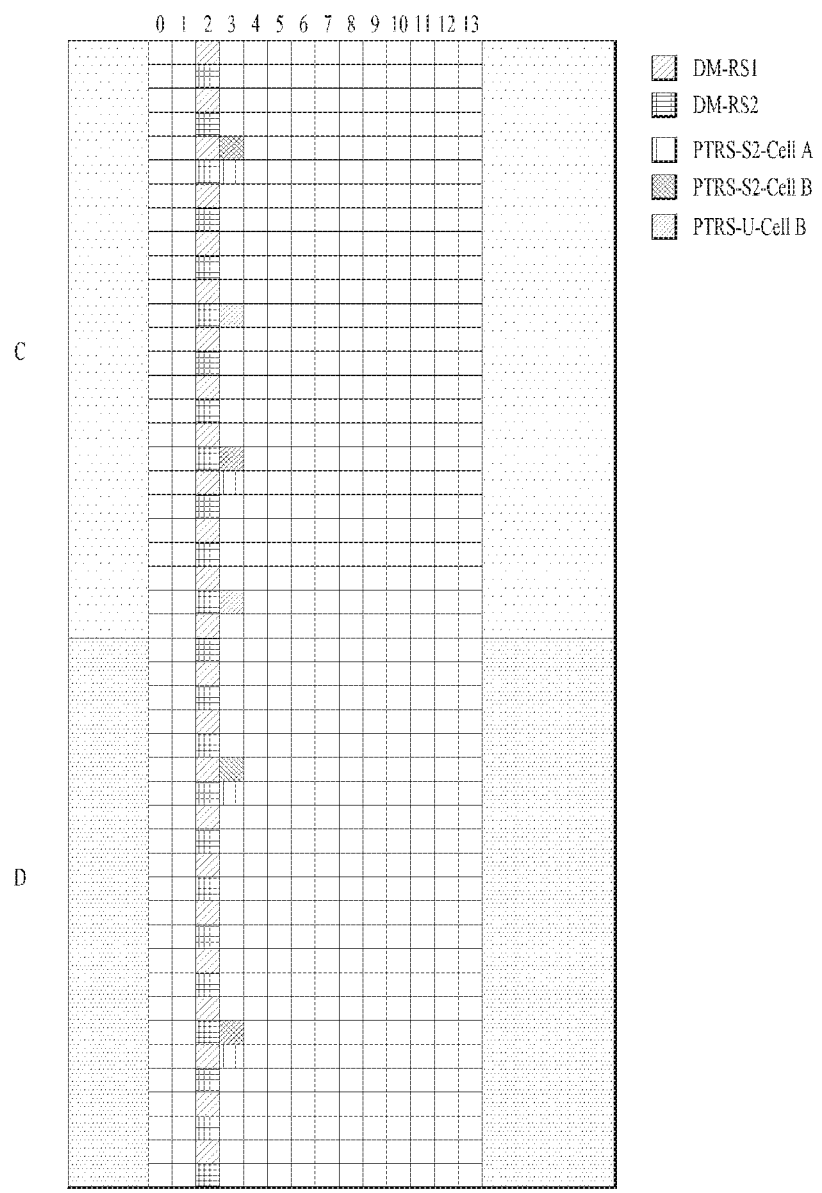
FIG. 26 is a diagram illustrating a method of allocating a shared PTRS only to an OFDM symbol next to a DMRS.

FIG. 26 illustrates a method of allocating a shared PTRS only to an OFDM symbol next to a DMRS. Referring to FIG. 26, when the shared PTRS is simply used for the CFO estimation, the shared PTRS can be sufficiently defined only in the third OFDM symbol. In this case, PTRS precoding may be equivalent to DMRS precoding.

In other words, when the PTRS is used only for the CFO estimation, the shared PTRS may be allocated to the OFDM symbol next to the DMRS by considering RS overhead. In addition, considering decoding latency, the PTRS precoding may be the same as the DMRS precoding.

When the shared-PTRS precoding is the same as the DMRS precoding, the shared PTRS may be allocated to the OFDM symbol next to the DMRS. However, the present disclosure is not limited thereto. For example, when different precoding is used in regions C and D, a UE allocated region C cannot obtain energy sufficient to perform phase tracking from the PTRS in region D, and thus the above configuration may be applied differently depending on each situation.

Proposal 9 (Method of Determining of Time-domain Locations of Shared PTRSs for Different Cells)

In different cells, the time-domain location of a shared PTRS can be next to that of a DMRS as described above with reference to FIG. 26. If the PTRS uses precoding different from that of the DMRS or if the PTRS uses no precoding, the shared PTRS may be defined on two columns in the time domain.

Figure 27:
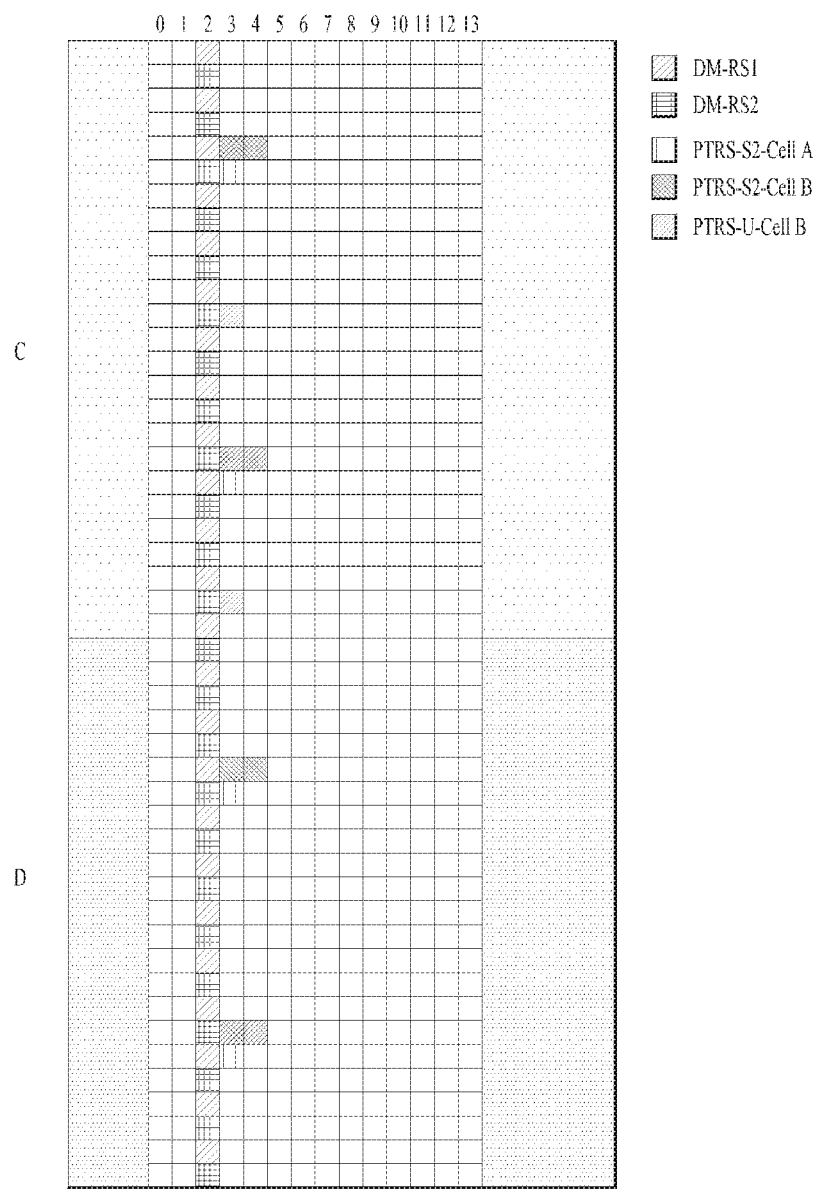
FIG. 27 is a diagram illustrating a method of allocating an additional shared PTRS.

Referring to FIG. 27, when a shared PTRS uses precoding different from that of a DMRS on the same subcarrier or when the shared PTRS uses no precoding, an additional shared PTRS may be allocated for phase tracking. That is, when the shared PTRS and the DMRS use different precoding or when the shared PTRS uses no precoding, the additional PTRS may be required for the phase tracking in spite of considering PTRS overhead. In this case, the shared PTRSs can be defined in two consecutive OFDM symbols. In other words, the shared PTRSs may be allocated to two columns of OFDM symbols next to the DMRS.

In the case of non-precoding, if a UE allocated region C uses the PTRS in region D, the UE may not have the energy penalty. Thus, the above configuration may be applied differently depending on each situation.

Figure 28:
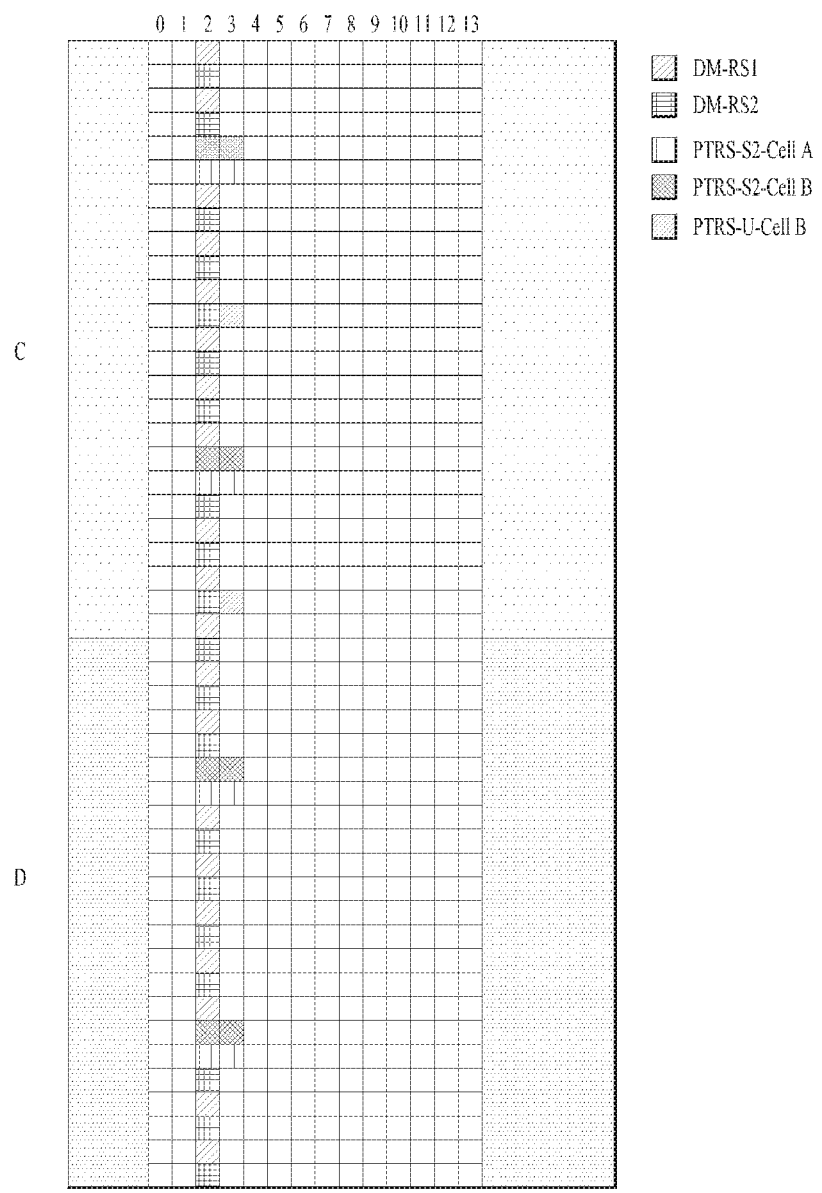
FIG. 28 is a diagram illustrating a method of allocating a shared PTRS to the location of a DMRS.

Referring to FIG. 28, a shared PTRS can be defined at the location of a DMRS. That is, even though DMRS channel estimation performance decreases, the shared PTRS may be allocated for phase tracking by considering RS overhead. By doing so, the overhead caused by the shared PTRS may decrease although the DMRS channel estimation performance is degraded. However, the present disclosure is not limited thereto.

Meanwhile, for example, a UE-dedicated PTRS may be allocated to an OFDM symbol next to the DMRS. That is, a PTRS allocated to the location of the DMRS may be a shared PTRS.

Proposal 10 (Method of Determining PTRS by Considering UE Performance)

A UE can transmit to a BS a parameter associated with its phase noise occurrence level through RRC. Thereafter, the BS can determine a PTRS pattern or whether to transmit it based on the parameter transmitted from the UE.

Here, the phase noise occurrence level means "a value obtained by quantizing a Signal to Interference Ratio (SIR) for phase noise of a corresponding UE", or it simply means "whether there is phase noise or not".

If the UE has a poor oscillator, its phase noise increases. In this case, the phase noise should be corrected to improve the performance of the UE. For the phase noise correction, the BS may allocate a PTRS to the corresponding UE (in downlink communication, the BS may transmit the PTRS to the UE, and in uplink communication, the UE may transmit the PTRS to the BS).

On the contrary, if the UE has a good oscillator, there is no performance degradation caused by the phase noise. However, the PTRS defined by the BS for the corresponding UE may degrade throughput. Thus, in this case, the BS may not define the PTRS for the corresponding UE to prevent the throughput from being degraded.

That is, the UE may provide information on its phase noise to the BS, and the BS may determine whether to transmit the PTRS based on the provided information. Further, the BS may determine the type of a PTRS resource set based on the information transmitted from the UE. However, the present disclosure is not limited thereto.

Meanwhile, even when the UE feeds back that there is no phase noise, if the BS defines the PTRS through DCI, the UE may perform CPE estimation using the PTRS in downlink communication and transmit the PTRS to the BS in uplink transmission.

Proposal 11 (Method of Determining PTRS Pattern)

A PTRS pattern can be determined based on a TRB size, CR, and/or MO as described above. For example, the PTRS pattern may correspond to a period in the time domain.

Figure 29:
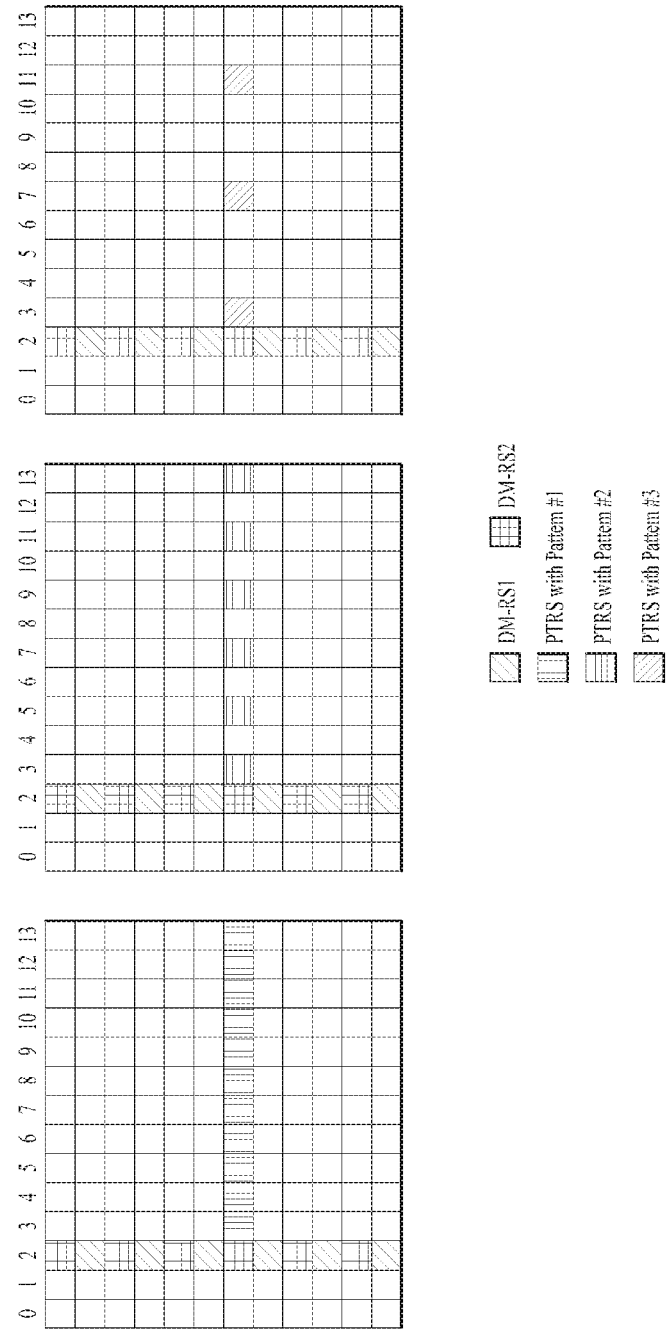
FIG. 29 is a diagram illustrating PTRS patterns.

FIG. 29 illustrates PTRS patterns. When the TRB size is small, even if the CR and MO are high, it is possible to select pattern 2 or 3 in FIG. 29. In this case, a phase difference between OFDM symbols where no PTRS is transmitted is calculated using values obtained from OFDM symbols where PTRS transmission is performed.

Specifically, the phase of the fourth OFDM symbol of pattern 3 may be calculated using a phase difference between the third OFDM symbol and the seventh OFDM symbol. In this case, to calculate the channel value of the fourth OFDM symbol, the seventh OFDM symbol should be received. However, this may become problematic in the case of an application or a service where latency is important. Thus, the PTRS pattern can be determined by considering the above-described issue. For example, in pattern 1, since PTRSs are allocated over the entire time domain, the above-described latency issue may not exist.

In other words, for the service or application where latency is important, PTRSs can be allocated over the entire time domain using pattern 1 even though the TRB size is small.

In summary, the PTRS pattern can be determined by considering not only the TRB size, CR, and MO but also service types (i.e., latency issue). However, the present disclosure is not limited thereto.

Figure 30:
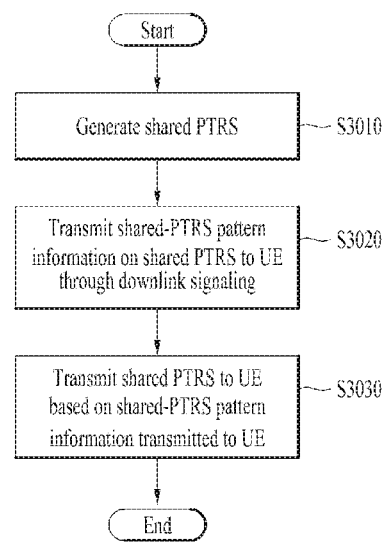
FIG. 30 is a flowchart illustrating a method in which a base station transmits a signal for phase noise cancellation in a communication system

FIG. 30 is a flowchart illustrating a method in which a BS transmits a signal for phase noise cancellation in a communication system.

A BS may generate a shared PTRS [S3010]. In this case, the BS may generate a shared PTRS that can be shared by all UEs as described above with reference to FIGS. 1 and 29. In addition, the BS may generate a UE-dedicated PTRS by considering a TRB size, CR, and MO, but the present disclosure is not limited thereto. Although the configurations described above in FIGS. 1 to 29 are focused on a BS, the configurations can be equally applied to a UE. That is, the operating entity may vary depending on whether uplink transmission or downlink transmission is performed, and the present disclosure includes both cases.

Next, the BS may transmit shared-PTRS pattern information on the shared PTRS to the UE through downlink signaling [S3020]. In this case, a plurality of shared-PTRS patterns may be configured for the UE as described above with reference to FIGS. 1 to 29. The BS may transmit, to the UE, the shared-PTRS pattern information instructing to apply one of the plurality of shared-PTRS patterns configured for the UE. Alternatively, only a single shared-PTRS pattern may be configured for the UE. In this case, the shared-PTRS pattern information may indicate whether the shared PTRS is transmitted or not. That is, the shared-PTRS pattern information may include information on ON/OFF of the shared PTRS.

Thereafter, the BS may transmit the shared PTRS to the UE based on the shared-PTRS pattern information transmitted to the UE [S3030]. The shared PTRS transmitted from the BS to the UE may be shared by all UEs. In this case, as described above, the UE-dedicated PTRS may be further allocated by considering the MCS level or TRB size applied to the UE.

Figure 31:
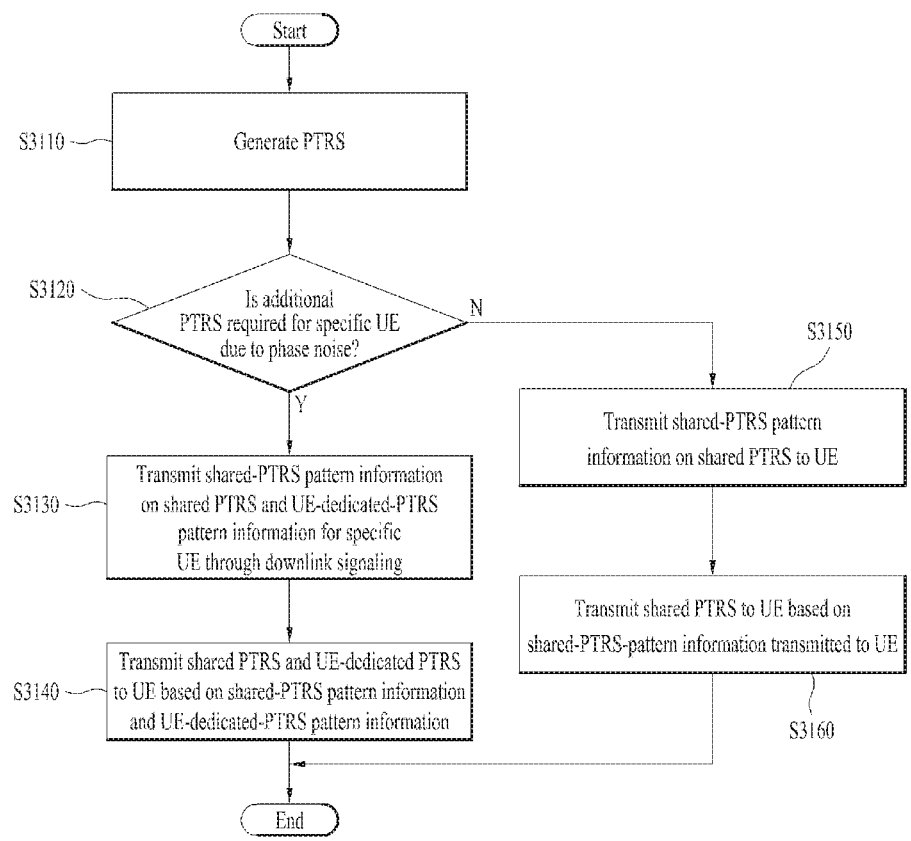
FIG. 31 is a diagram illustrating a method of transmitting a shared PTRS and a UE-dedicated PTRS.

FIG. 31 illustrates a method of transmitting a shared PTRS and a UE-dedicated PTRS.

A BS may generate a PTRS [S3110]. In this case, the BS may generate the PTRS in the same manner as described above with reference to FIG. 30.

Next, whether an additional PTRS is required for a specific UE may be determined based on phase noise of the specific UE [S3120]. Whether the additional PTRS is required may be determined for each UE as described above with reference to FIGS. 1 to 30. For example, in the case of a UE that is significantly affected by its phase noise, it may be determined that the additional PTRS is required. The BS may signal to such a UE through DCI and/or RRC that the additional PTRS is required. The type of the shared PTRS may be configured through RRC, and the pattern of the UE-dedicated PTRS may be signaled through DCI and/or RRC. However, the present disclosure is not limited thereto.

Whether the additional PTRS is required may be implicitly indicated based on an MCS level or a TRB size. That is, it may be indicated that the additional PTRS is required based on the MCS level or TRB size applied to the UE without any extra signaling.

Thereafter, when the additional PTRS is required, the BS may transmit shared-PTRS pattern information on the shared PTRS and UE-dedicated-PTRS pattern information for the specific UE through downlink signaling [S3130]. As described above with reference to FIGS. 1 to 30, the UE-dedicated PTRS may be added based on the phase noise. Since the UE-dedicated PTRS is configured per UE, the UE-dedicated PTRS may be transmitted or not transmitted to the specific UE.

The BS may transmit, to the specific UE, the shared PTRS and UE-dedicated PTRS based on the shared-PTRS pattern information and UE-dedicated-PTRS pattern information as described above with reference to FIGS. 1 to 30 [S3140].

Further, when the additional PTRS is not required, the BS may transmit the shared-PTRS pattern information on the shared PTRS to the UE [S3150]. Thereafter, the BS may transmit the shared PTRS to the UE based on the shared-PTRS-pattern information transmitted to the UE [S3160]. In other words, when the BS determines that the additional PTRS is not required by considering the phase noise as described above with reference to FIGS. 1 to 30, the BS may not allocate the UE-dedicated PTRS as described above with reference to FIG. 30.

Device Configuration

Figure 32:
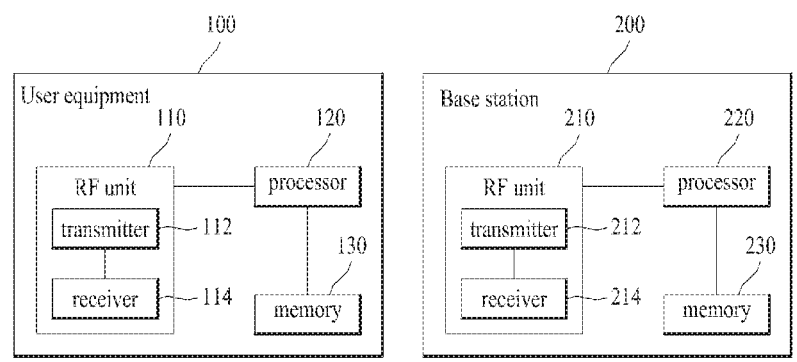
FIG. 32 is a diagram illustrating the configuration of a user equipment and a base station according to an embodiment of the present disclosure.

FIG. 32 is a diagram illustrating the configuration of a user equipment and a base station according to an embodiment of the present disclosure. In FIG. 31, the user equipment 100 and the base station 200 may include radio frequency (RF) units 110 and 210, processors 120 and 220, and memories 130 and 230, respectively. Although FIG. 32 shows a 1:1 communication environment between the user equipment 100 and base station 200, a communication environment may be established between a plurality of user equipments and a plurality of base stations. In addition, the configuration of the base station 200 shown in FIG. 32 can be applied to a macro cell base station and a small cell base station.

The RF units 110 and 210 may include transmitters 112 and 212 and receivers 114 and 214, respectively. The transmitter 112 and the receiver 114 of the user equipment 100 are configured to transmit and receive signals to and from the base station 200 and other user equipments. The processor 120 is functionally connected to the transmitter 112 and the receiver 114 and controls processes performed by the transmitter 112 and the receiver 114 to transmit and receive signals to and from other devices. The processor 120 processes a signal to be transmitted, sends the processed signal to the transmitter 112, and processes a signal received by the receiver 114.

If necessary, the processor 120 may store information in an exchanged message in the memory 130. With the above configuration, the user equipment 100 can perform the methods described in various embodiments of the present disclosure.

The transmitter 212 and the receiver 214 of the base station 200 are configured to transmit and receive signals to and from another base station and user equipments. The processor 220 is functionally connected to the transmitter 212 and the receiver 214 and controls processes performed by the transmitter 212 and the receiver 214 to transmit and receive signals to and from other devices. The processor 220 processes a signal to be transmitted, sends the processed signal to the transmitter 212, and processes a signal received by the receiver 214. If necessary, the processor 220 may store information in an exchanged message in the memory 230. With the above configuration, the base station 200 can perform the methods described in various embodiments of the present disclosure.

The processors 120 of the user equipment 100 and the processor 220 of the base station 200 instruct (for example, control, adjust, or manage) operations of the user equipment 100 and the base station 200, respectively. The processors 120 and 220 may be connected to the memories 130 and 230 to store program code and data, respectively. The memories 130 and 230 are respectively connected to the processors 120 and 220 so as to store operating systems, applications and general files.

Each of the processors 120 and 220 of the present disclosure may be called a controller, a microcontroller, a microprocessor, a microcomputer, etc. Each of the processors 120 and 220 may be implemented by hardware, firmware, software, or any combination thereof.

When the embodiments of the present disclosure are implemented by hardware, application specific integrated circuits (ASICs), digital signal processors (DSPs), digital signal processing devices (DSPDs), programmable logic devices (PLDs), field programmable gate arrays (FPGAs), and the like may be included in the processors 120 and 220.

In case of the implementation by firmware or software, a method according to each embodiment of the present disclosure can be implemented by modules, procedures, and/or functions for performing the above-explained functions or operations. Software code may be stored in a memory unit and be then executed by a processor. The memory unit may be provided within or outside the processor to exchange data with the processor through the various means known to the public.

As mentioned in the foregoing description, the detailed descriptions for the preferred embodiments of the present disclosure are provided to be implemented by those skilled in the art. While the present disclosure has been described and illustrated herein with reference to the preferred embodiments thereof, it will be apparent to those skilled in the art that various modifications and variations can be made therein without departing from the spirit and scope of the invention. Therefore, the present disclosure is non-limited by the embodiments disclosed herein but intends to give a broadest scope matching the principles and new features disclosed herein. In addition, although the present disclosure has been described with reference to the preferred embodiments thereof, it will be apparent to those skilled in the art that not only the invention is not limited to the aforementioned specific embodiments but various modifications can be made in the present disclosure without departing from the spirit or scope of the invention. Such modifications are not to be construed individually from the technical spirit and scope of the present disclosure.

In addition, both an apparatus invention and a method invention are explained in the present specification, and if necessary, the descriptions of both the inventions can be complementally applied.

INDUSTRIAL APPLICABILITY

The present disclosure can be applied not only to the 3GPP system but also to various wireless communication systems including IEEE 802.16x and IEEE 802.11x systems. Further, the proposed method can be applied to an mmWave communication system using ultra-high frequency band.

What is claimed is:

1. A method of transmitting a signal for phase noise cancellation by a base station in a mmWave communication system, the method comprising:
generating a shared Phase Tracking Reference Signal (PTRS) for phase noise of a downlink signal;
transmitting shared-PTRS pattern information on the shared PTRS to a User Equipment (UE) through downlink signaling; and
transmitting the shared PTRS to the UE based on the shared-PTRS pattern information transmitted to the UE,
wherein a resource location of the shared PTRS in frequency and time domains varies in each cell.

2. The method of claim 1, comprising:
further generating a UE-dedicated PTRS for the phase noise of the downlink signal;
further transmitting UE-dedicated-PTRS pattern information on the UE-dedicated PTRS to the UE through the downlink signaling; and
further transmitting the UE-dedicated PTRS to the UE based on the UE-dedicated-PTRS pattern information transmitted to the UE.

3. The method of claim 2, wherein the shared PTRS is shared with another UE, and wherein the UE-dedicated PTRS is used only by the UE.

4. The method of claim 1, wherein the resource location in the frequency and time domains is determined by either or both of Radio Resource Control (RRC) and a cell ID.

5. The method of claim 1, wherein the shared PTRS has precoding identical to that of a Demodulation Reference Signal (DMRS) located in the same frequency domain.

6. The method of claim 5, wherein the shared PTRS is configured in one Orthogonal Frequency Division Multiplexing (OFDM) symbol in the time domain.

7. The method of claim 1, wherein the shared PTRS has precoding different from that of a Demodulation Reference Signal (DMRS) located in the same frequency domain.

8. The method of claim 7, wherein the shared PTRS is configured in two Orthogonal Frequency Division Multiplexing (OFDM) symbols in the time domain.

9. The method of claim 1, wherein a plurality of shared-PTRS patterns are configured for the UE through either or both of Radio Resource Control (RRC) and Downlink Control Information (DCI), and wherein information for selecting any one from among the plurality of shared-PTRS patterns configured for the UE is additionally configured through either or both of the RRC and the DCI.

10. A base station for transmitting a signal for phase noise cancellation in a mmWave communication system, the base station comprising:
a receiver configured to receive signals from external devices;
a transmitter configured to transmit signals to external devices; and
a processor configured to control the receiver and the transmitter, wherein the processor is configured to:
generate a shared Phase Tracking Reference Signal (PTRS) for phase noise of a downlink signal;
transmit shared-PTRS pattern information on the shared PTRS to a User Equipment (UE) through downlink signaling; and
transmit the shared PTRS to the UE based on the shared-PTRS pattern information transmitted to the UE,
wherein a resource location of the shared PTRS in frequency and time domains varies in each cell.

11. The base station of claim 10, wherein the processor is configured to:
 further generate a UE-dedicated PTRS for the phase noise of the downlink signal;
 further transmit UE-dedicated-PTRS pattern information on the UE-dedicated PTRS to the UE through the downlink signaling; and
 further transmit the UE-dedicated PTRS to the UE based on the UE-dedicated-PTRS pattern information transmitted to the UE.

12. The base station of claim 11, wherein the shared PTRS is shared with another UE, and wherein the UE-dedicated PTRS is used only by the UE.

13. The base station of claim 11, wherein the resource location in the frequency and time domains is determined by either or both of Radio Resource Control (RRC) and a cell ID.

14. The base station of claim 10, wherein the shared PTRS has precoding identical to that of a Demodulation Reference Signal (DMRS) located in the same frequency domain.

15. The base station of claim 14, wherein the shared PTRS is configured in one Orthogonal Frequency Division Multiplexing (OFDM) symbol in the time domain.

16. The base station of claim 10, wherein the shared PTRS has precoding different from that of a Demodulation Reference Signal (DMRS) located in the same frequency domain.

17. The base station of claim 16, wherein the shared PTRS is configured in two Orthogonal Frequency Division Multiplexing (OFDM) symbols in the time domain.

18. The base station of claim 10, wherein a plurality of shared-PTRS patterns are configured for the UE through either or both of Radio Resource Control (RRC) and Downlink Control Information (DCI), and wherein information for selecting any one from among the plurality of shared-PTRS patterns configured for the UE is additionally configured through either or both of the RRC and the DCI.

\* \* \* \* \*